United States Patent
Peterson et al.

(10) Patent No.: US 10,277,055 B2
(45) Date of Patent: Apr. 30, 2019

(54) BATTERY WIRELESS CHARGING SYSTEM

(71) Applicant: Electrochem Solutions, Inc., Clarence, NY (US)

(72) Inventors: Brian R. Peterson, Cumberland, RI (US); Eric Jankins, Raynham, MA (US); Ronald H. Robnett, Santa Monica, CA (US)

(73) Assignee: Greatbatch Ltd., Clarence, NY (US)

( * ) Notice: Subject to any disclaimer, the term of this patent is extended or adjusted under 35 U.S.C. 154(b) by 350 days.

(21) Appl. No.: 15/055,063

(22) Filed: Feb. 26, 2016

(65) Prior Publication Data

US 2016/0254694 A1    Sep. 1, 2016

Related U.S. Application Data

(60) Provisional application No. 62/121,307, filed on Feb. 26, 2015.

(51) Int. Cl.
  *H02J 7/00*  (2006.01)
  *H02J 7/02*  (2016.01)
  (Continued)

(52) U.S. Cl.
  CPC ............ *H02J 7/025* (2013.01); *H02J 7/0044* (2013.01); *H02J 50/10* (2016.02); *H02J 50/90* (2016.02); *H02J 7/0052* (2013.01)

(58) Field of Classification Search
  USPC .................................................. 320/106–115
  See application file for complete search history.

(56) References Cited

U.S. PATENT DOCUMENTS 7,211,986 B1   5/2007   Flowerdew et al.
8,461,719 B2   6/2013   Kesler et al.
(Continued)

FOREIGN PATENT DOCUMENTS

EP    2610990 EP    7/2013

OTHER PUBLICATIONS

European Search, Application No. 16157719.2, dated Jun. 28, 2016.
(Continued)

*Primary Examiner* — Binh Tat
(74) *Attorney, Agent, or Firm* — Michael F. Scalise; Steven W. Winn

(57) ABSTRACT

A system for wirelessly charging an electrical energy storage device such as an electrochemical cell or battery pack is described. The system comprises a transmitting base unit having a charging tray that is capable of wirelessly transmitting electrical power received from an external electrical energy source. In addition, the system comprises an electrical energy capture assembly that is electrically incorporatable with an energy storage device. The energy capture assembly comprises a receiving coil that is electrically connected to various sub-circuits that condition and modify the wirelessly received electrical energy so that it re-charges the energy storage device. The system is primarily designed to be used with electrical power that is wirelessly transmitted by near field magnetic induction. The circuitry of the system is designed to accommodate for fluctuations in magnitude of wirelessly transmitted electrical power. In addition, system is designed to optimally utilize wireless near field magnetic induction electrical power.

21 Claims, 17 Drawing Sheets

(51) Int. Cl.
*H02J 50/10* (2016.01)
*H02J 50/90* (2016.01)

(56) References Cited

U.S. PATENT DOCUMENTS

| | | |
|---|---|---|
| 2009/0121675 A1 | 5/2009 | Ho et al. |
| 2012/0062175 A1 | 3/2012 | Miller et al. |
| 2012/0235634 A1 | 9/2012 | Hall et al. |
| 2013/0147427 A1* | 6/2013 | Polu ................. H03F 1/56 |
| | | 320/108 |
| 2013/0249479 A1 | 9/2013 | Partovi et al. |
| 2014/0091756 A1* | 4/2014 | Ofstein ............. H02J 5/005 |
| | | 320/108 |
| 2014/0097791 A1 | 4/2014 | Lisuwandi et al. |
| 2014/0176064 A1 | 6/2014 | Rejman et al. |
| 2014/0268894 A1 | 9/2014 | Shinohara et al. |
| 2015/0022142 A1* | 1/2015 | Garcia Briz ...... B60L 11/1829 |
| | | 320/108 |

OTHER PUBLICATIONS

Extended European Search, Application No. 16185667.9, dated Jan. 18, 2017.
Extended European Search, Application No. 16157719.2, dated Oct. 24, 2016.

\* cited by examiner

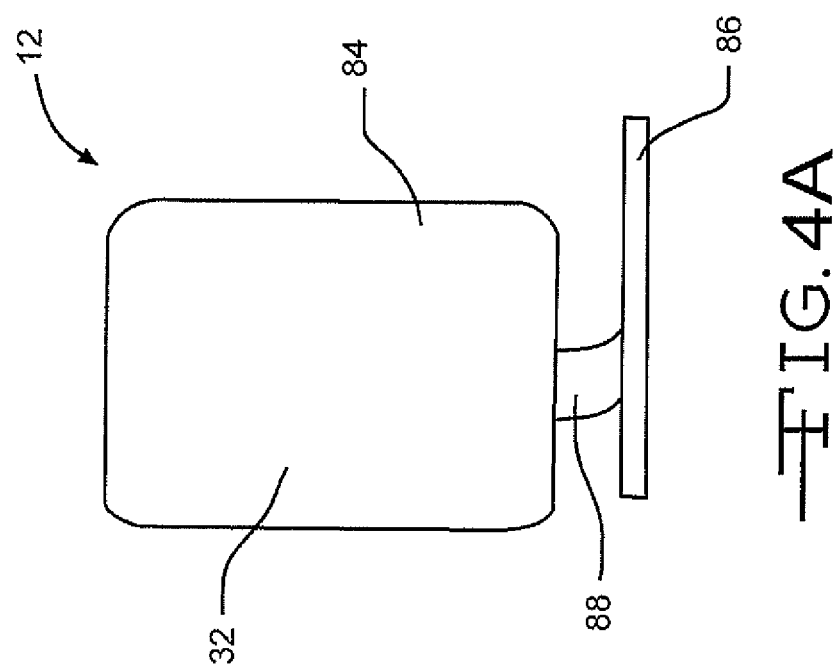
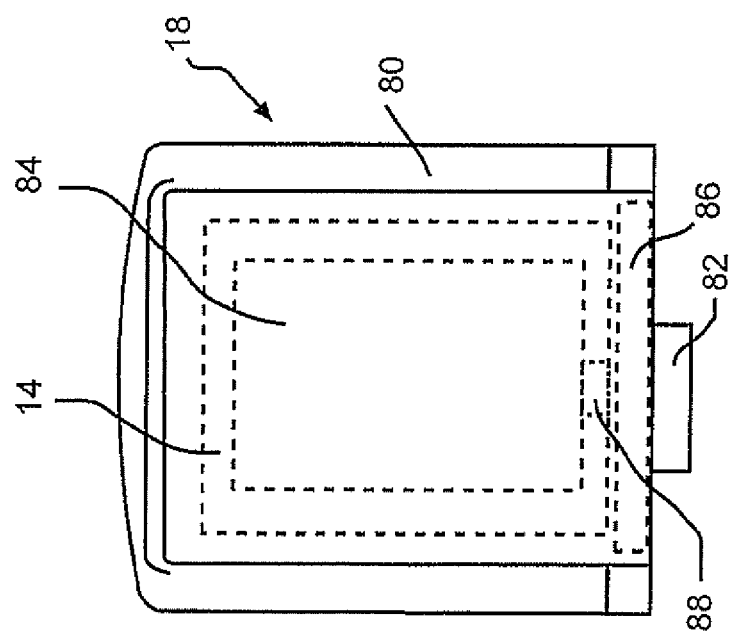

BATTERY WIRELESS CHARGING SYSTEM

CROSS-REFERENCE TO RELATED APPLICATION

This application claims priority from U.S. Provisional Patent Application Ser. No. 62/121,307, filed Feb. 26, 2015.

FIELD OF THE INVENTION

The present invention relates to a system for wirelessly charging electrochemical cells. In particular, the invention relates to a circuit for controlling and modifying wireless electrical power to charge an electrochemical cell.

PRIOR ART

Battery chargers are typically used to recharge an electrochemical cell or battery pack. The electrical circuitry within these chargers is designed to manage electrical power such that electrical energy within an electrochemical cell or battery pack is restored. As such, battery chargers comprise electrical circuitry that controls the amount of electrical energy that is replenished within the cell. Traditional battery chargers are typically required to be tethered to an electrical outlet. Furthermore, traditional battery chargers generally require that the cell or battery pack be positioned between electrical terminals within a slot or cavity of the charger. The charging device having the cell or battery pack positioned therewithin is then plugged into an electrical outlet receptacle to initiate charging.

However, it is often difficult to utilize these traditional charging devices to recharge electrochemical cells having a relatively small size, such as those that are used to power small medical devices. In many cases it is often difficult to position and remove small sized cells within these traditional charging devices. Furthermore, secondary batteries are often configured with connector pins that are used to establish electrical connection within a traditional charging device. These connector pins often outwardly extend from the cell, thereby adding size and bulk to electrochemical cells. Thus, these extending connector pins are generally not desired because they tend to limit miniaturization of the cell. Miniaturization is generally desirable for cells that are used to power small medical devices, such as hearing aids and medical hand tools, as they enable minimally invasive designs.

In addition, some electrochemical cells are hermetically sealed to minimize ingress of fluids, such as water and air. Such hermetically sealed electrochemical cells are often used to power medical devices, such as implantable or semi-implantable hearing aids and minimally invasive laparoscopic power tools. In many cases, these electrochemical cells are encased within a protective sealant. Thus, hermetically sealing an electrochemical cell having protruding electrical connector terminals is often challenging as the protruding terminals may compromise the cell's hermetic seal.

In contrast, wireless power enables an energy storage device, such as secondary electrochemical cell, to be charged without the need for a physical electrical connection between the charging device and energy storage device. The need for electrical connection terminal pins is minimized which, thus, enables miniaturization and hermetic sealing. Wireless charging is, therefore, ideal for charging a hermetically sealed battery or a battery having a relatively small size.

One such means of wirelessly transmitting electrical power to recharge an electrical energy storage device is by using near field resonant inductive coupling. Near field resonant inductive coupling is ideal for charging energy storage devices, particularly those having a relatively small size, because it provides for efficient wireless transfer of electrical power. In near field resonant inductive coupling, electrical energy is transferred wirelessly between two resonators that are tuned to resonate at about the same frequency. The first, or source resonator, is electrically connected to a power supply, and the second, or receiving resonator, is positioned a distance from the source resonator. When the two resonators resonate, an oscillating magnetic field between the two is created that enables transfer of electrical energy therebetween. More specifically, near field resonant inductive coupling typically uses coupled electromagnetic resonators with long-lived oscillatory resonant modes to transfer electrical power. Near field resonant inductive coupling is further discussed in U.S. Pat. No. 8,461,719 to Kesler et al.

Electrical power, however, that is transferred wirelessly between two resonators, such as by using near field resonant induction, is generally not in a condition for charging an electrochemical cell. Furthermore, the strength of the electrical power from a wireless power source is typically dependent upon the separation distance and angular position of respective transmission and receiving wireless power coils. Thus, as the separation distance between the transmitting and receiving coils increases and/or the angular position between the respective coils becomes increasingly askew, the amount of transmitted electrical power decreases. Likewise, as the separation distance between the respective transmitting and receiving coils decreases and/or the position of the respective coils becomes more aligned, the magnitude of the transmitted electrical power increases. Therefore, it is fairly common for the strength of a wirelessly transmitted electrical power source to fluctuate, particularly when the receiving coil is moved.

Therefore, there is a need for electrical circuitry that enables efficient capture and conditioning of wireless electrical energy to recharge a battery or battery pack. The present invention addresses these needs by providing an electrical power control circuit that enables use of wirelessly transferred electrical power that addresses fluctuations in the strength of the electrical power due to coil separation and angular orientation.

The present invention thus provides a battery charging system that is capable of converting an available electrical power source into a wireless electrical power for optimally recharging one or a plurality of electrical energy storage devices. The charging system of the present invention is designed to optimally harness electrical power transmitted wirelessly by near field inductive coupling such that it can be used to charge an energy storage device.

SUMMARY OF THE INVENTION

The present invention provides a charging system that utilizes wirelessly transmitted electrical energy to charge an energy storage device. More specifically, the present invention provides a charging system that utilizes near field resonant inductive coupling to wirelessly transmit electrical energy to electrically charge one or more energy storage devices. The charging system comprises a transmitting base unit and an electrical energy capture assembly that is electrically incorporated with an energy storage device. The base unit wirelessly transmits electrical energy that is received from an external electrical power supply. The electrical energy capture assembly harnesses the wireless energy and conditions the energy such that it can be used to charge an energy storage device. The capture assembly is preferably incorporated with an energy storage device such that the wireless electrical energy received by the transmitting base unit is utilized to charge the device.

The base unit comprises an energy transmitting circuit that is electrically connected to a resonant coil antenna. The energy transmitting circuit conditions electrical energy received from an external electrical power source, such as an electrical outlet, for wireless transmission using near field resonant inductive coupling. The antenna circuit comprises a resonant coil antenna that wirelessly transmits the electrical energy. The capture assembly, which receives the wirelessly transmitted electrical energy, comprises an electrical energy receiving circuit that is electrically connected to a receiving resonant coil antenna.

The charging system works by placing at least one electrical energy storage device, equipped with an energy capture assembly, in contact with, or in the vicinity of, the transmitting base unit. Electrical power is transmitted wirelessly between the base unit and the energy capture equipped energy storage device by receiving the magnetic field that is transmitted by the base unit. As such, it is important that the wirelessly equipped energy storage device is in relatively close proximity and in an optimal orientation to the transmitting base unit to ensure maximum electrical power transfer.

The transmitting base unit of the wireless charging system is designed with a charging tray within which at least one energy storage device equipped with an energy capture assembly is positioned. The tray portion that is built within the housing of the base unit provides optimal orientation of the energy storage device with respect to the transmitting antenna that resides within the base unit. The tray portion preferably has a tray platform that extends from upwardly extending tray sidewalls. In a preferred embodiment, the tray portion forms a concavity within the housing of the base. The tray is formed within the housing of the base unit such that the lower platform of the tray is positioned in close proximity and directly above the center region of the antenna. Thus, the tray portion formed within the base housing provides for optimal positioning of the energy storage device with the transmitting antenna. The position of the tray with respect to the transmitting antenna thus reduces the distance therebetween and positions the energy storage device in a more direct line of sight with the magnetic field that emanates from the base antenna.

The charging tray provides space such that a multitude of energy storage devices can be charged simultaneously. The charging tray may be dimensioned to accommodate a multitude of energy storage devices having a variety of shapes and sizes. For example, the charging tray could be dimensioned to allow for a battery pack to be positioned therewithin. Alternatively, the charging tray could be dimensioned to hold the electronic device that is being powered by the cell or battery pack.

These and other objects of the present invention will become increasingly more apparent to those skilled in the art by reference to the following description and to the appended drawings.

BRIEF DESCRIPTION OF THE DRAWINGS

FIG. 4 illustrates an embodiment of a wirelessly configured electrochemical cell.

FIG. 4A shows an embodiment of the wireless energy capture assembly of the present invention.

DETAILED DESCRIPTION OF THE PREFERRED EMBODIMENTS

Figure 1:
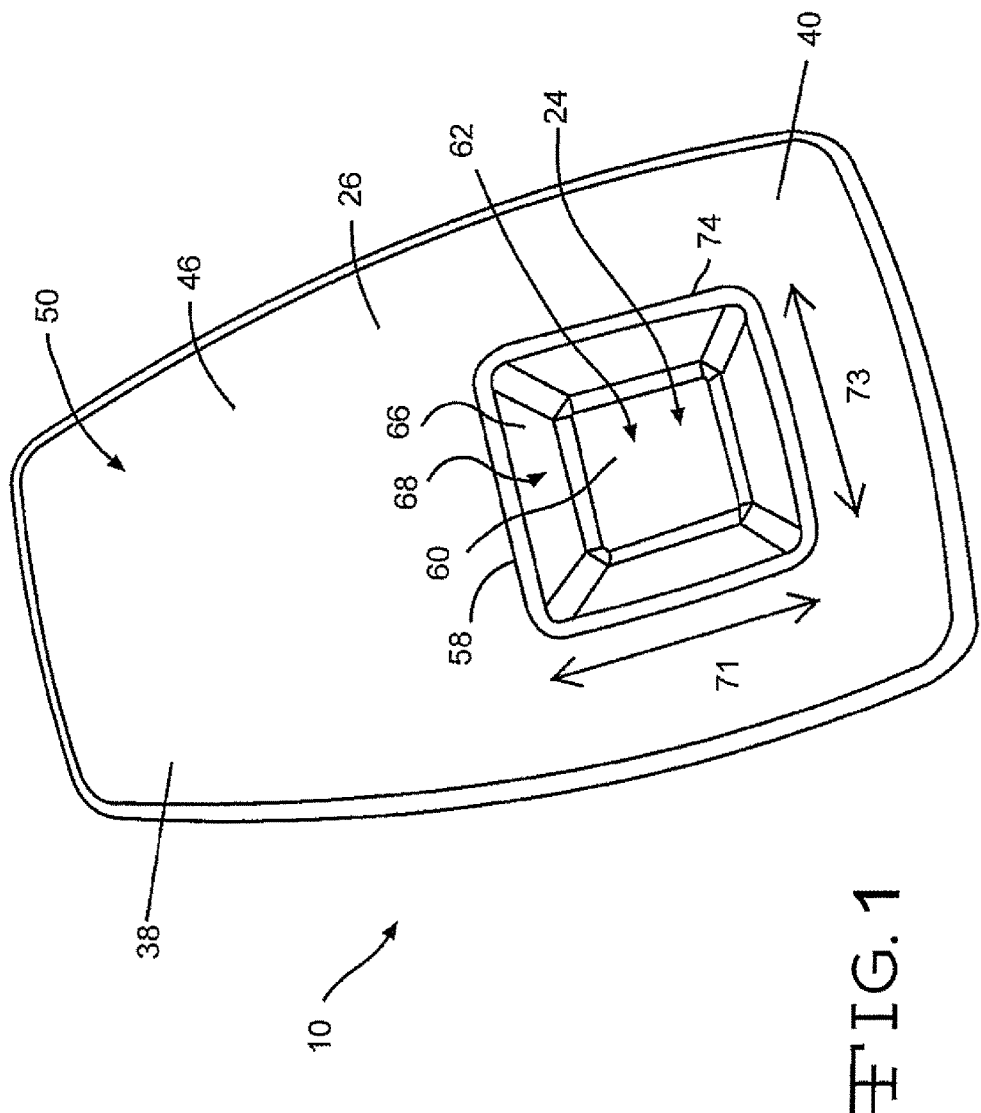
FIG. 1 is a top view of an embodiment of the wireless energy transmitting base unit of the present invention.

The wireless charging system of the present invention comprises a base unit 10 (FIG. 1) configured to wirelessly transmit electrical energy and an electrical energy capture assembly 12 (FIG. 4A) configured to receive the transmitted electrical energy. In a preferred embodiment, the energy capture assembly 12 is electrically connectable to an energy storage device 14 (FIG. 4B) to enable wireless reception of electrical power from the transmitting base unit 10 to the energy storage device 14. The energy capture assembly 12 is preferably configured to receive electrical energy that is wirelessly transmitted by the base unit 10. The base 10 conditions electrical energy that is received by an external electrical energy supply (not shown) for use in charging an energy storage device 14, such as an electrochemical cell or battery pack.

In a preferred embodiment, the wireless charging system of the present invention is designed to utilize near field resonant inductive coupling to wirelessly transmit alternating current electrical energy from the base 10 to the electrical energy storage device 14. As will be described in more detail, the base 10 comprises an energy transmitting circuit 16 (FIG. 10) that conditions and wirelessly transmits electrical energy received from an external electrical power supply, such as an electrical outlet.

In a preferred embodiment, each energy storage device 14 is configured with one energy capture assembly 12 (FIG. 4A), thereby creating a wireless energy storage device 18 (FIG. 4). The energy capture assembly 12 comprises an energy receiving circuit 20 (FIG. 5) that is electrically connected to a receiving antenna 22. The energy receiving circuit 20 captures and converts the wirelessly transmitted electrical energy so that it can be used to recharge the energy storage device 14 that is attached thereto. The energy capture assembly 12 can either be positioned on an exterior surface of the energy storage device 14 or, alternatively, it may be electrically incorporated within the structure of the energy storage device 14.

Figure 3:
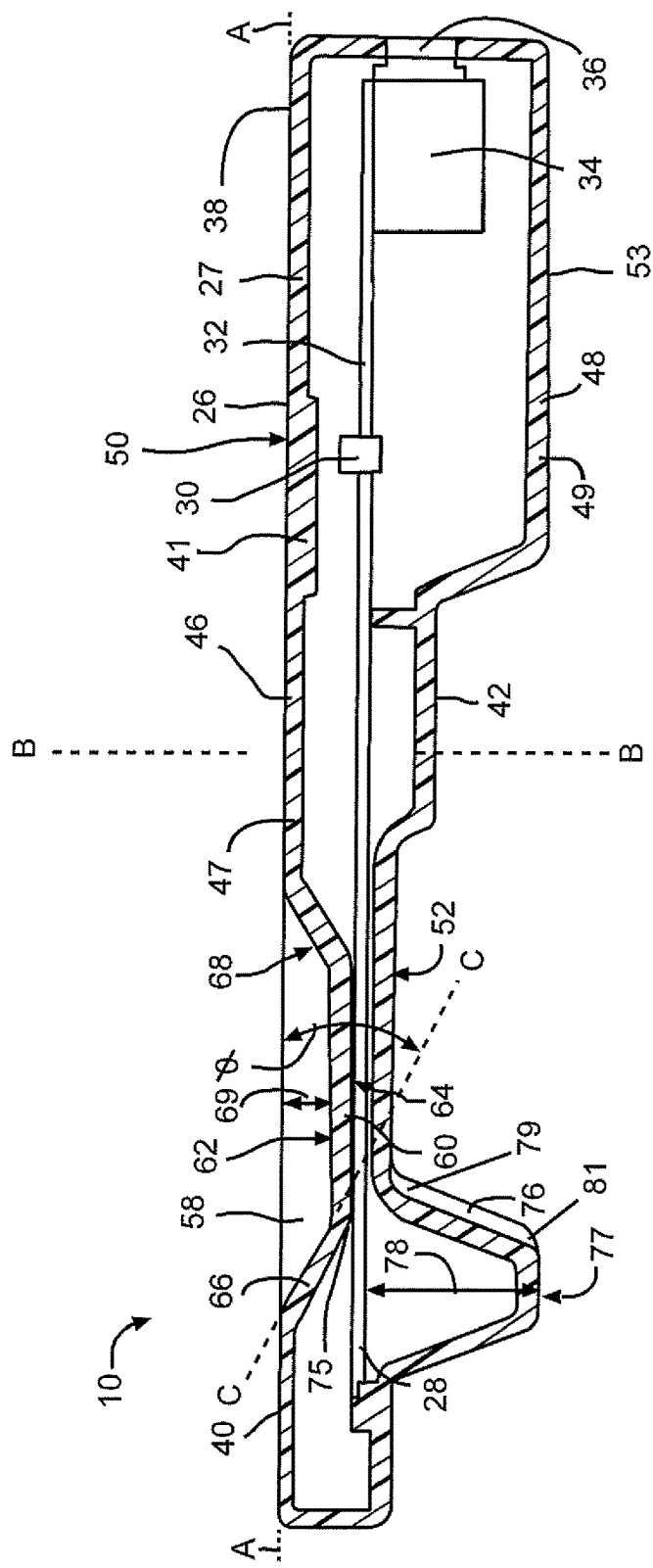
FIG. 3 is a cross-sectional view taken along longitudinal axis A-A of the wireless energy transmitting base shown in FIG. 1.
Figure 3A:
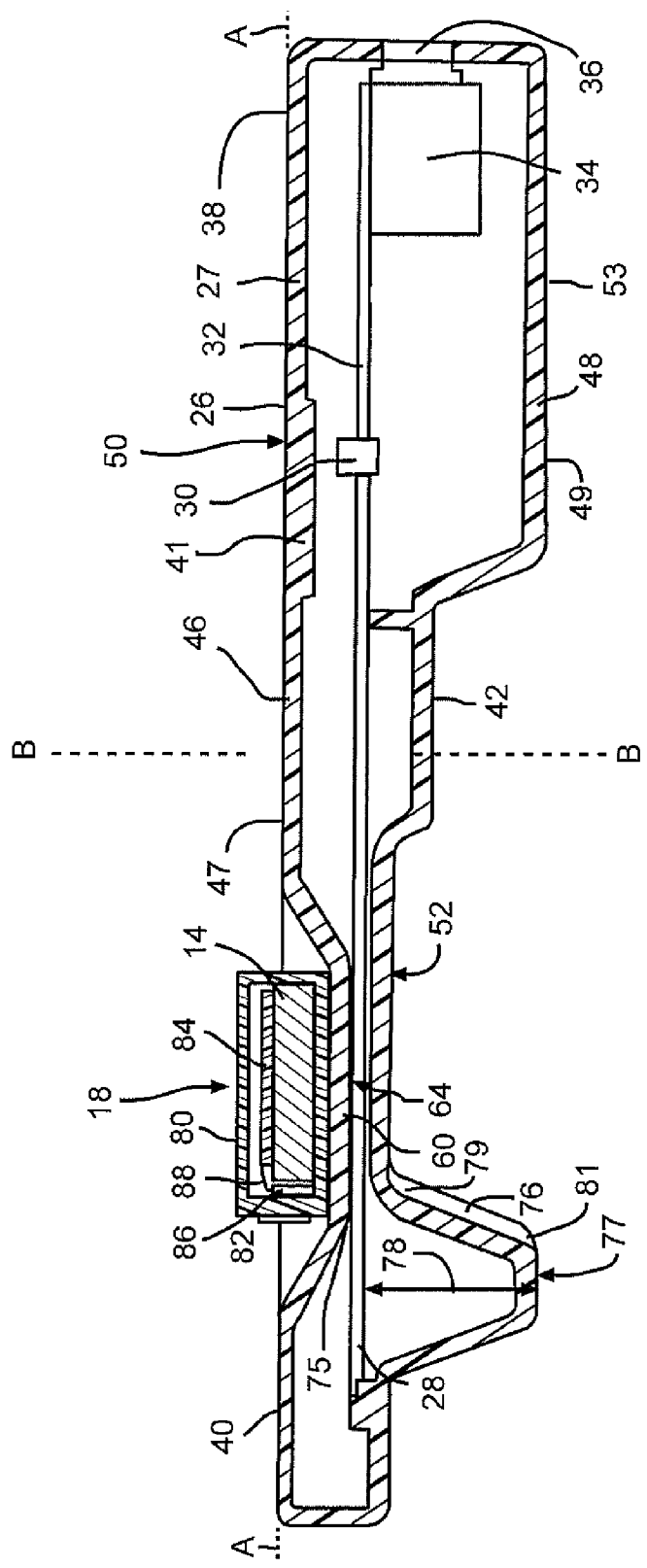
FIG. 3A is a cross-sectional view taken along longitudinal axis A-A of an embodiment of a wirelessly configured electrochemical cell positioned within the charging tray of the wireless energy transmitting base unit of FIG. 1.

In a preferred embodiment, the energy storage device 14, configured with the energy capture assembly 12, is charged by positioning the cell/energy capture assembly on a charging surface 24 of the base 10 (FIG. 3A). As such, multiple energy storage devices 14 may be simultaneously charged by positioning them in contact with the charging surface 24 of the base 10. In a further embodiment, the electrochemical cell or battery pack does not have to be removed from the device being powered. For example, the device that is being powered by the cell or battery pack may be positioned on, or in proximity of, the charging surface 24 (FIG. 1) of the transmitting base 10. Thus, the possibility that the energy storage device 14 may become contaminated, as a result of removing a cell from a device, is reduced.

As defined herein, an electrical energy storage device is an apparatus that is capable of repeatably storing electrical energy. An electrochemical cell is a device capable of generating electrical energy from a chemical reaction. A "battery pack" comprises a plurality of at least two electrochemical cells that are electrically connected together to provide an electrical power source. In a preferred embodiment the electrochemical cell or battery pack comprises at least one rechargeable or secondary electrochemical cell. As defined herein, "charge power" is the electrical power emitted by the charging system that charges an electrical energy storage device, such as an electrochemical cell or battery pack. "Charge current" is the electrical current that is emitted by the charging system to charge a cell. "Charge voltage" is the electrical voltage that is emitted by the charging system to charge a cell. "Charge power" (P) is equal to charge voltage (V) multiplied by charge current (I).

Electrical power received wirelessly by the energy capture circuit 20 of the present invention is preferably designed to charge a secondary electrochemical cell or battery pack. Such secondary electrochemical cells may include, but are not limited to, electrochemical chemistries such as lithium ion (Li-ion), lithium ion polymer (Li-ion polymer), nickel metal hydride (NiMH), and nickel cadmium (NiCd). In a preferred embodiment, the charging system of the present invention may be used to enable charging of cells and power packs requiring from about 1 milliwatts to about 500 kilowatts of electrical power.

Specifically in near-field resonant inductive coupling wireless electrical power transfer, a source resonator or transmitting coil is electrically connected to an electrical power generator with direct electrical connections. A receiving resonator, or receiving coil, positioned a distance away from the source resonator, is electrically connected to a load (i.e., a device) with direct electrical connections. The source and receiving resonators are coupled via a magnetic field therebetween to exchange electrical energy wirelessly between the source and the receiving resonators in order to transmit electrical power from the power generator to the device.

A resonator may be constructed such that the energy stored by the electric field is primarily confined within the resonator structure and energy stored by the magnetic field is primarily in the region surrounding the resonator. Thus, the electrical energy exchange is mediated primarily by the resonant magnetic near-field surrounding the space about the resonators. The resonator, sometimes referred to as a "coil", is generally constructed by wrapping a metallic wire around a core of magnetic material. Additional information about resonators utilized in near field resonant induction power transfer can be found in U.S. patent application publication no. 2012/0235634 to Hall et al.

Figure 4B:
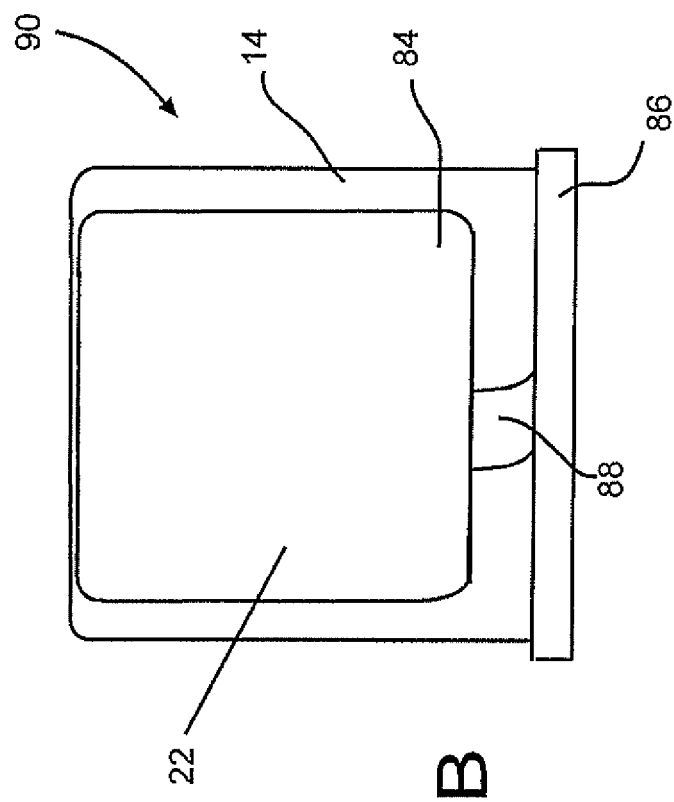
FIG. 4B illustrates an embodiment of an electrochemical cell electrically connected to the wireless energy capture assembly shown in FIG. 4A.

Now turning to the figures, FIGS. 1-3, and 3A illustrate an embodiment of the energy transmitting base unit 10 of the wireless charging system of the present invention. FIGS. 4, 4A and 4B show embodiments of the energy capture assembly 12 and incorporated energy storage device 14. FIGS. 5-9 illustrate electrical schematic diagrams of various electrical circuits that comprise the energy capture circuit 20 that is housed within the energy capture assembly 12. FIGS. 10-14 illustrate electrical schematic diagrams of various electrical circuits that comprise the energy transmitting circuit 16 that resides within the energy transmitting base unit 10.

Figure 2:
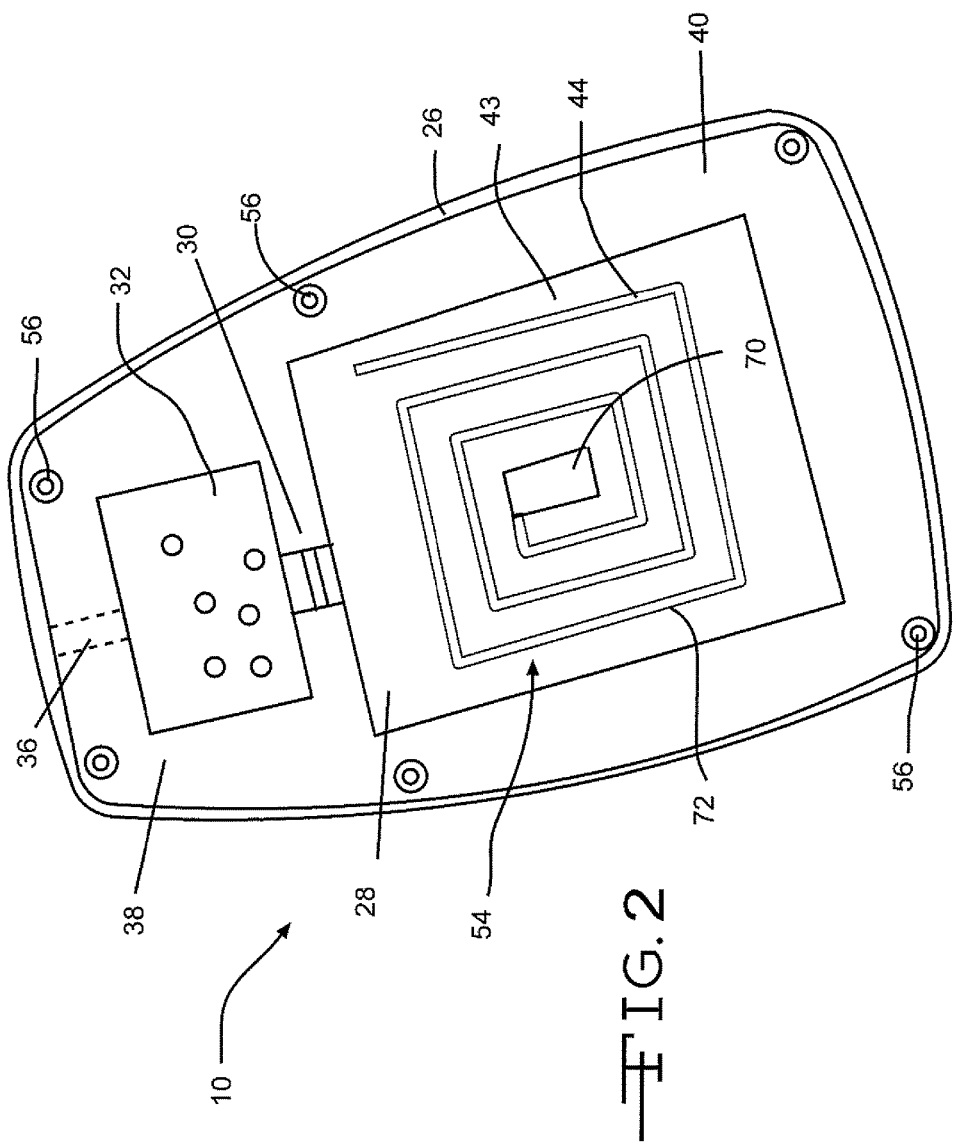
FIG. 2 is cross-sectional view taken perpendicular to longitudinal axis A-A of the wireless energy transmitting base shown in FIG. 1.

FIGS. 1-3, and 3A illustrate an embodiment of the energy transmitting base unit 10 of the wireless charging system of the present invention. As shown, the base 10 comprises a housing 26 having a housing sidewall 27 that encloses an antenna circuit board 28 and a main circuit board 32 (FIGS. 2 and 3) therewithin. The antenna circuit board 28 and the main circuit board 32 are electrically connected by connector 30. In addition, as illustrated in FIG. 3, the housing 26 may enclose a base power supply 34 that is electrically connected to the main circuit board 32. Alternatively, the base power supply 34 may be positioned external of the base unit 10. In addition, the housing 26 encloses an electrical power supply connector 36 that connects the base 10 to an external electrical energy supply (not shown). The power supply 34 serves to provide electrical power to operate the base unit 10. In addition, the power supply 34 provides the electrical energy that is converted into wireless electrical power.

The main circuit board 32 that resides within the base unit 10 supports the electronic sub-circuits that operate the base unit 10 and condition the electrical energy for wireless transmission. As illustrated in FIG. 2, the antenna circuit board 28 supports a wireless energy transmitting antenna 43 that comprises a resonant inductor coil 44. The coil 44 wirelessly transmits the electrical energy that is conditioned by the main circuit board 32 by emanating a magnetic field therefrom.

As illustrated in FIG. 3, the base unit 10 extends lengthwise along longitudinal axis A-A from a base proximal end 38 to a base distal end 40. Imaginary axis B-B, oriented about perpendicular to longitudinal axis A-A, extends from a top end 41 to a bottom end 42 of the base unit 10. In a preferred embodiment, the housing 26 of the base 10 comprises opposed first and second housing portions 46, 48, each having respective first and second housing portion sidewalls 47, 49. As shown, the first housing portion having a top surface 50 is positioned opposed from the second housing portion 48 having a contoured bottom surface 52. The opposing first and second housing portions 46, 48, are joined together to enclose the antenna circuit board 28, the main circuit board 32, base power supply 34, and electrical power supply connector 36 therewithin. As illustrated in FIG. 2, the transmitting inductor coil 44 resides on an exterior surface 54 of the antenna circuit board 28. In a preferred embodiment, the opposing first and second housing portions 46, 48 are joined together with at least one housing fixture 56, such as a rivet or screw. Alternatively, the first and second housing portions 46, 48 may be joined by an adhesive or they may be welded together.

As shown in FIGS. 1, 3, and 3A, the housing 26 of the base unit 10 comprises a recessed tray portion 58 having a tray platform 60 that extends from an angled perimeter tray sidewall 66. Specifically, the tray 58 is a depression that is formed within the housing 26 of the base unit 10. In a preferred embodiment, the tray 58 comprising the tray platform 60 and angled perimeter tray sidewall 66 is formed by the first portion housing sidewall 27. As shown, the tray 58 comprising the platform 60, having first and second or upper and lower platform surfaces 62, 64 and angled perimeter tray sidewall 66, is formed within the base housing.

In a preferred embodiment, the tray platform 60 extends below the top surface 50 of the first housing portion 46 of the transmitting base 10. As shown, the tray platform 60 is positioned proximate the antenna circuit board 28 that resides within the housing 26. In a preferred embodiment the tray platform 60 extends substantially parallel to longitudinal axis A-A. As illustrated in FIGS. 1 and 3A the tray platform 60 and the angled perimeter sidewall 66 are formed by the housing sidewall, having a tray sidewall surface 68 that downwardly extends from the top housing surface 50 to the tray platform 60. In a preferred embodiment, the perimeter sidewall 66 is positioned at an angle φ with respect to longitudinal axis A-A. Specifically tray sidewall angle φ extends between the top surface 50 of the first major housing portion 46 along longitudinal axis A-A and imaginary line C-C that extends along the tray sidewall surface 68. In an embodiment, the tray sidewall angle φ may range from about 10° to about 90°. The tray 58 is dimensioned to hold at least one energy storage device 14. In a preferred embodiment, tray 58 has a depth 69 that may range from about 0.5 cm to about 25 cm, a length 71 that may range from about 1 cm to about 25 cm and a width 73 that may range from about 1 cm to about 25 cm.

FIG. 3A illustrates an embodiment of an energy storage device 14 (FIG. 4B) configured with the energy capture assembly 12, positioned within the tray 58 of the base unit 10. It is noted that the illustration of the wirelessly configured electrochemical cell 18, shown in the embodiment of FIG. 3A, has been enlarged to further illustrate the components of the energy capture assembly 12 positioned therewithin. Positioning the energy storage device 14 within the confines of the tray 58 increases re-charge efficiency as the tray portion 58 orients the energy storage device 14 closer to the magnetic field that is emitted by the transmitting antenna during re-charge. In an embodiment, an exterior surface of the energy charging device 14 is placed in relatively close proximity to the first or upper surface 62 of the tray platform 60. Alternatively, an exterior surface of the of the energy storage device 14 may be positioned in physical contact with the first or upper surface 62 of the tray platform 60. In an embodiment, the first surface 62 of the tray platform 60 serves as the charging surface 24 of the charging base 10. In addition, the tray 58 positions the energy storage device 14 in a preferred orientation with respect to the energy transmitting circuit 20.

As shown in FIG. 3, the tray platform 60 is positioned directly above the transmitting antenna coil 44. In an embodiment, a first gap 75 resides between the exterior surface 54 of the antenna circuit board and the second or lower surface 64 of the tray platform 60. In a preferred embodiment, the first gap 75 ranges from about 0.1 mm to about 5 mm. The first gap 75 separates the tray platform 60 from the antenna circuit board 28 such that an optimal amount of electrical energy is transferred from the first transmitting coil 44 to the energy storage device 14. In addition, the tray 58 is positioned about a center region 70 of the transmitting antenna coil 44, thus encouraging proper alignment between the antenna and the energy storage device 14. In a preferred embodiment, the tray 58 is designed such that an outer perimeter 72 of the first transmitting coil 44 extends beyond a perimeter 74 of the tray 58, as defined by the angled perimeter sidewall 66. In a preferred embodiment, the outer perimeter 72 of the first transmitting coil 44 extends beyond the perimeter 74 of the energy storage device receiving tray 58 by a distance that ranges from about 1 mm to about 10 mm. Thus, the energy storage device receiving tray 58 is dimensioned and positioned with respect to the first transmitting coil 44 to provide for optimal and efficient transmission of near field wireless electrical energy between the transmitting base 10 and energy storage device 14.

As illustrated in FIG. 3, the second housing portion 48 preferably comprises a foot 76 having a first foot end 79 spaced from a second foot end 81 that resides at the housing distal end 40. As shown, the foot 76 is preferably formed by the sidewall 49 of the second housing portion. In a preferred embodiment, the foot 76 is oriented about perpendicular to longitudinal axis A-A and extends away from the first housing portion 46. As illustrated, the foot 76 extends about perpendicular from longitudinal axis A-A from the first foot end 79 to the second foot end 81 having and exterior surface 77. The first foot end 79 resides proximal to the antenna circuit board 28 which is positioned within the housing 26.

The foot 76 is constructed to provide a second gap 78 that extends between the first transmitting coil 44 and a surface on which the transmitting base unit 10 rests. In use, the base unit 10 is positioned such that a spaced apart second foot 53 of the contoured sidewall 49 of the second housing portion 48 and the exterior surface 77 of the second foot end 81 rest or are supported on a substrate surface, such as a surface of a desk or table (not shown). In some cases, a metallic surface may interfere with the performance of the transmitting base unit 10. Specifically, a metallic substrate material may interfere with the magnetic field that emanates from the first transmitting coil 44, thereby preventing the magnetic field from traveling through the air. Thus, the foot 76 is designed to position the antenna circuit board 28 a desired distance away from the supporting substrate surface thereby minimizing potential interference. In a preferred embodiment, the foot 76 provides the second gap 78 that separates the first transmitting coil 44 from the resting surface such that potential interference of the magnetic fields caused by a metallic resting surface is minimized. In a preferred embodiment, the second gap 78 between the transmitting first coil 44 and the exterior foot surface 77 that is positionable on a resting or support surface is at least about 2.5 cm. More preferably, the second gap 78 may extend a distance that ranges from about 2.5 cm to about 10 cm.

FIGS. 4, 4A, and 4B illustrate an embodiment of the wirelessly configured energy storage device 18 and components thereof. In a preferred embodiment, as shown in FIG. 4, the wireless energy storage device 18 comprises an energy storage device 14 that is electrically connected to the energy capture assembly 12 (FIG. 4A) and encased within a wireless energy storage device housing 80. As further illustrated in FIG. 4, the wireless energy storage device 18 may comprise a protrusion or receptacle 82 that provides for electrically connecting the wireless energy storage device 18 to an electrical device, such as a medical device or power tool that is desired to be powered.

FIG. 4A illustrates an embodiment of the energy capture assembly 12 that is electrically connectable to an energy storage device 14 (FIG. 4B). As shown, the assembly 12 comprises an energy capture circuit board 84 that is electrically connected to an electrical connector 86 by an electrical junction 88. In addition, the electrical connector 86 provides for the electrical connection between the energy capture circuit board 84 and the energy storage device 14. As illustrated in FIG. 4B, which illustrates an embodiment of an assembly 90 of the energy capture assembly 12 with an electrochemical cell 14, the electrical junction 88 is electrically connected to the electrical connector 86 and the energy capture circuit board 84. An electrochemical cell 14 is electrically connectable to the electrical connector 86. Specifically, the electrical connector 86 is designed to connect the terminals of an electrochemical cell 14 to the energy capture circuit board 84. The electrical connector 86 joins the electrochemical cell 14 to the energy capture circuit board 84 through the electrical junction 88.

In an embodiment, the energy capture circuit board 84 supports the sub-circuits that comprise the energy capture circuit 20 and the receiving antenna 22 comprising a receiving inductor coil. The electrical connector 86 may comprise a multiple of non-limiting electrical connectors such that wireless electrical energy received by the energy capture assembly 12 is captured by the energy storage device 14 when the energy capture assembly 12 and energy storage device 14 are connected together. The electrical junction 88 may comprise a plurality of non-limiting electrical junctions. Examples of electrical junctions 88 may include, but are not limited to, an electrically conductive wire, an electrically conductive bar or sheet, or an electrical cable. In an embodiment, the energy capture circuit board 84 may be constructed of a polymeric material such that the board is capable of mechanical flexure and bending. Examples of polymeric materials include, but are not limited to polyimide, and polyether ether ketone (PEEK).

FIG. 4B shows an embodiment of the assembly 90 of an energy storage device 14 that is electrically connected to the energy capture assembly 12 of the present invention. Specifically, as shown, an energy storage device 14 is electrically connected to the electrical connector 86 of the energy capture assembly 12. The assembly 90, which comprises an electrochemical cell 14 and the energy capture assembly 12, is preferably encased within the housing 80, as shown in FIG. 4. As shown in the embodiment, an electrochemical cell 14 is electrically attached to the electrical connector 86. In addition, the electrical connector 86 is electrically connected to the energy capture circuit board 84 via the electrical junction 88. Furthermore, the electrical connector 86 is electrically connected to the receptacle 82 of the housing 80 for electrical connection to a device that is to be powered. Furthermore, as illustrated in FIG. 4B, the energy capture assembly 12 is attached to an exterior surface of the energy storage device 14. However, it is contemplated that the energy capture assembly 12 may be incorporated within the structure of the energy storage device 14.

Referring back to FIG. 3A, a cross-sectional view of an embodiment of a wireless energy storage device 18 is shown. As illustrated, the assembly 90 of an electrochemical cell 14 configured with the energy capture assembly 12 in the housing 80 is shown. In an embodiment the cell 14 is electrically connected to the energy capture circuit board 84. As shown, the electrochemical cell 14 is electrically connected to the electrical connector 86 which is also electrically connected to the energy circuit board 84 via the electrical junction 88. The electrical connector 86 is also electrically connected to the receptacle 82 of the housing 80. It is noted that the wirelessly configured electrochemical cell or battery pack 18 may be positioned within the tray 58 such that the upper or lower surface of the energy capture circuit board 84 is positioned substantially parallel, perpendicular, or at an askew angle with respect to the upper platform surface 62.

FIGS. 5-14 illustrate embodiments of electrical schematic diagrams of the various circuits that comprise the wireless charging system of the present invention. FIGS. 5-9 illustrate electrical schematic diagrams of the sub-circuits that comprise the energy capture circuit 20 that is electrically incorporated with the energy storage device 14. FIGS. 10-14 illustrate embodiments of electrical schematic diagrams of the sub-circuits that comprise the energy transmitting circuit 16 that is housed within the transmitting base unit 10.

Figure 5:
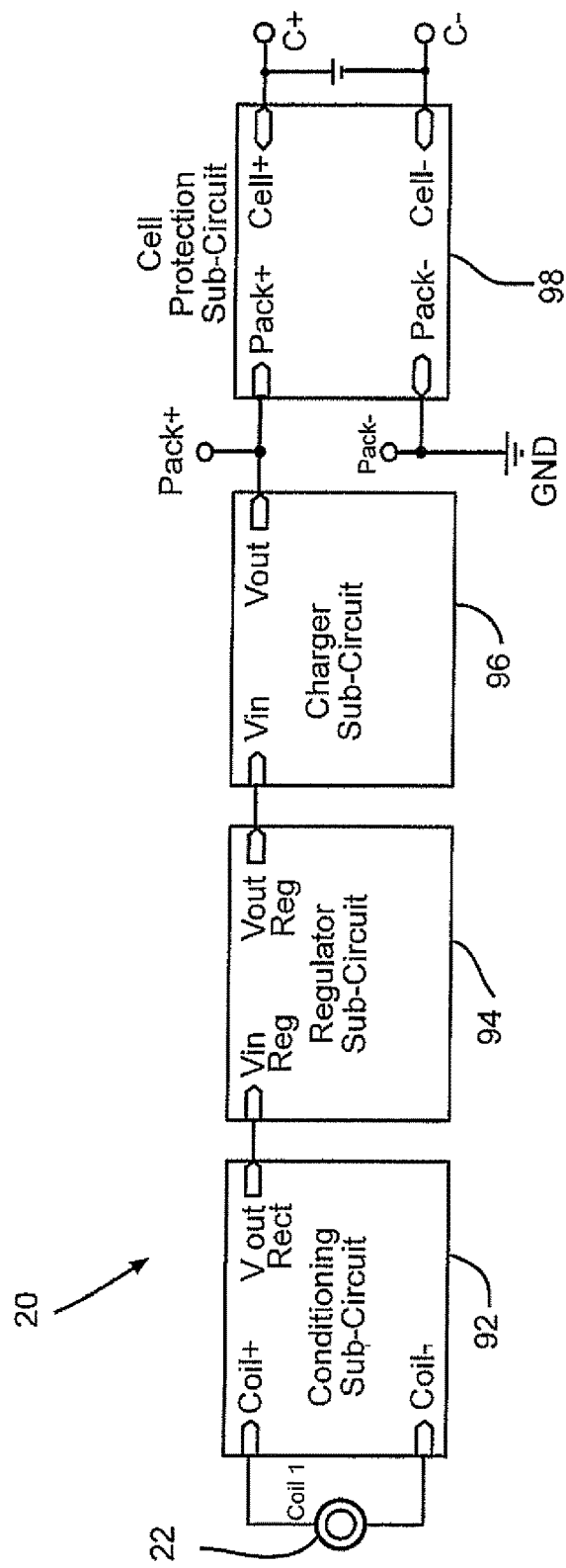
FIG. 5 illustrates an electrical schematic diagram of an embodiment of a wireless energy capture circuit that is incorporated with an electrical energy storage device.

FIG. 5 illustrates an electrical schematic diagram of an embodiment of the wireless power capture circuit 20 of the present invention. The power capture circuit 20 is designed to receive and modify electrical power that is wirelessly transmitted from the transmitting base unit 10. More specifically, the electrical power capture circuit 20 of the present invention is designed to harness and condition wirelessly transmitted electrical power having an alternating current (AC) for use in charging an electrochemical cell or battery pack with direct current (DC) electrical power.

As illustrated in FIG. 5, the energy capture circuit 20 comprises an electrical energy conditioning sub-circuit 92, a voltage regulator sub-circuit 94, a charger sub-circuit 96 and a cell protection sub-circuit 98. The receiving antenna or coil 22 is electrically connected to the energy conditioning sub-circuit 92. In an embodiment, the power capture circuit 20 is designed to harness and convert an electrical power having an alternating current (AC) that is transmitted wirelessly from the transmitting coil 44, housed within the base unit 10, to an electrical power having a direct current that is used to re-charge an electrochemical cell 14. More specifically, the electrical power capture circuit 20 is designed to receive and modify an alternating current electrical power that is transmitted wirelessly via near field resonant inductive coupling such that the modified electrical power can be used to recharge an energy storage device 14, such as an electrochemical cell or battery pack.

Figure 6:
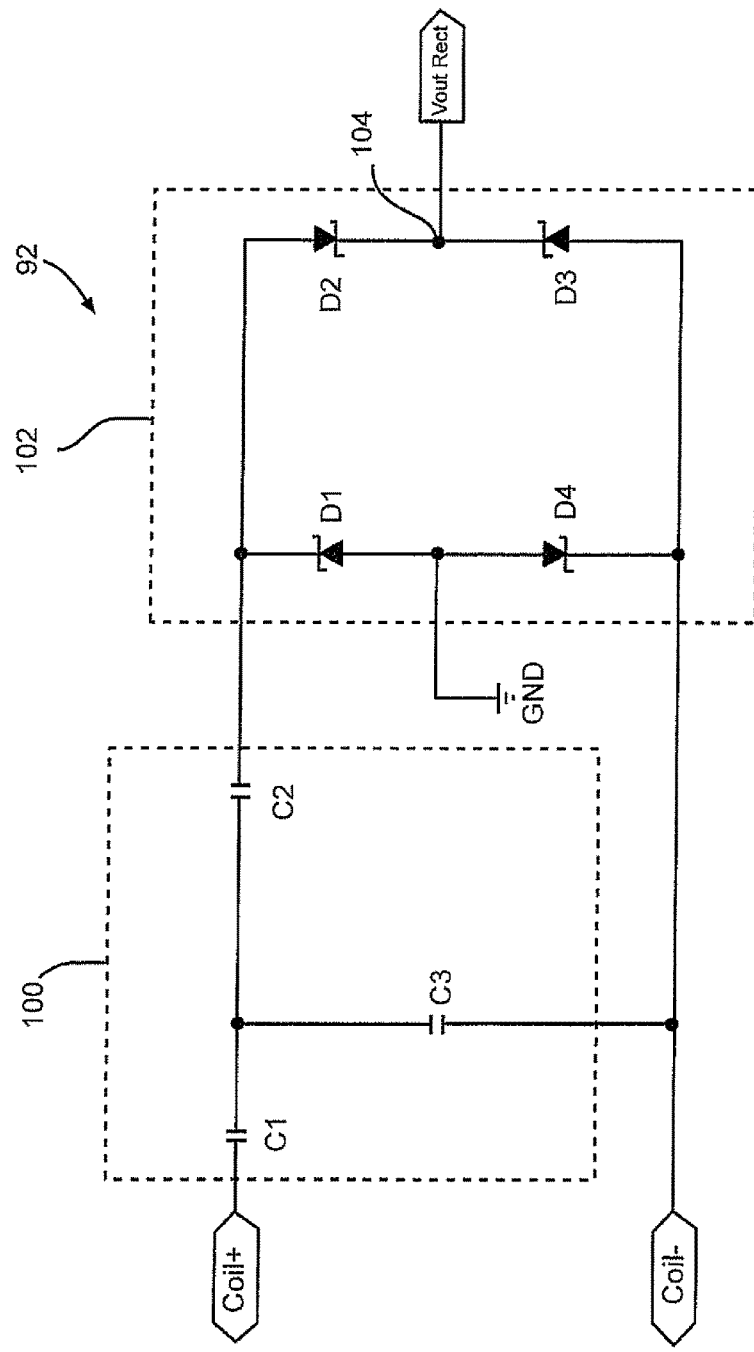
FIG. 6 shows an electrical schematic diagram of an electrical energy conditioning sub-circuit having a matching electrical impedance circuit and a rectifying circuit that is comprised within the wireless energy capture circuit shown in FIG. 5.

FIG. 6 illustrates an electrical schematic diagram of an embodiment of the electrical energy conditioning sub-circuit 92. The conditioning sub-circuit 92 is designed to capture and modify alternating current electrical power that is transmitted wirelessly via near field resonant inductive coupling and convert it into direct current (DC) electrical power such that it can be used to charge an attached electrochemical cell or battery pack.

As shown, the electrical energy conditioning sub-circuit 92 comprises a matching electrical impedance circuit 100 and a rectification circuit 102. The conditioning sub-circuit 92 serves to convert the wireless electrical power received by the receiving coil 22 of the energy receiving circuit 20 from an alternating current electrical power to a direct current electrical power for use in charging an energy storage device 14. The electrical impedance matching or network circuit 100 is electrically connected to the rectification circuit 102. The impedance matching circuit 100 is designed to adjust and match the electrical impedance of the receiving coil 22 to a characteristic impedance of the power generator or the load at a driving frequency of the source or transmitting first resonator 44. In general, the efficiency and amount of electrical power delivered between the transmitting coil and a receiving coil is largely dependent on the impedance of the inductive element of the transmitting and receiving coils relative to the electrical properties of the device to which the receiving coil is connected thereto. Therefore, the impedance-matching network circuit 100 is designed to maximize the efficiency of the electrical power delivered between the source resonator 44 and the receiving second coil 22.

As illustrated, the impedance matching network circuit 100 comprises a series of capacitors $C_1$-$C_3$ that are arranged to actively adjust and match the electrical impedance of the receiving resonator 22 to the electrical impedance of the transmitting resonator 44 and connected electrical power source. It is noted that some capacitors may be added or removed to achieve optimal impedance match.

The captured wireless electrical power passes from the matching network circuit 100 to the rectification circuit 102. In a preferred embodiment, the rectification circuit 102 modifies the electrical current of the received electrical power from an alternating current to a direct current. In a preferred embodiment illustrated in the electrical schematic of FIG. 6, the rectification circuit 102 comprises a series of diodes, $D_1$-$D_4$. As illustrated in FIG. 6, after the wireless electrical power is modified by the matching network circuit 100 and the rectification circuit 102 the electrical power exits the conditioning sub-circuit 92 at node 104.

The rectified electrical power is then directed to the voltage regulator sub-circuit 94 and the charging sub-circuit 96 where the power is modified to charge an energy storage device 14. The voltage regulator sub-circuit 94 modifies the amplitude of the voltage of the incoming electrical power so that it can be used to charge the energy storage device. In an embodiment, the voltage regulator sub-circuit 94 comprises a step-down voltage regulator that reduces the amplitude of the voltage of the incoming electrical power. In a preferred embodiment, the voltage regulator sub-circuit 94 reduces the amplitude of the voltage of the captured electrical power to about 5V.

Figure 7:
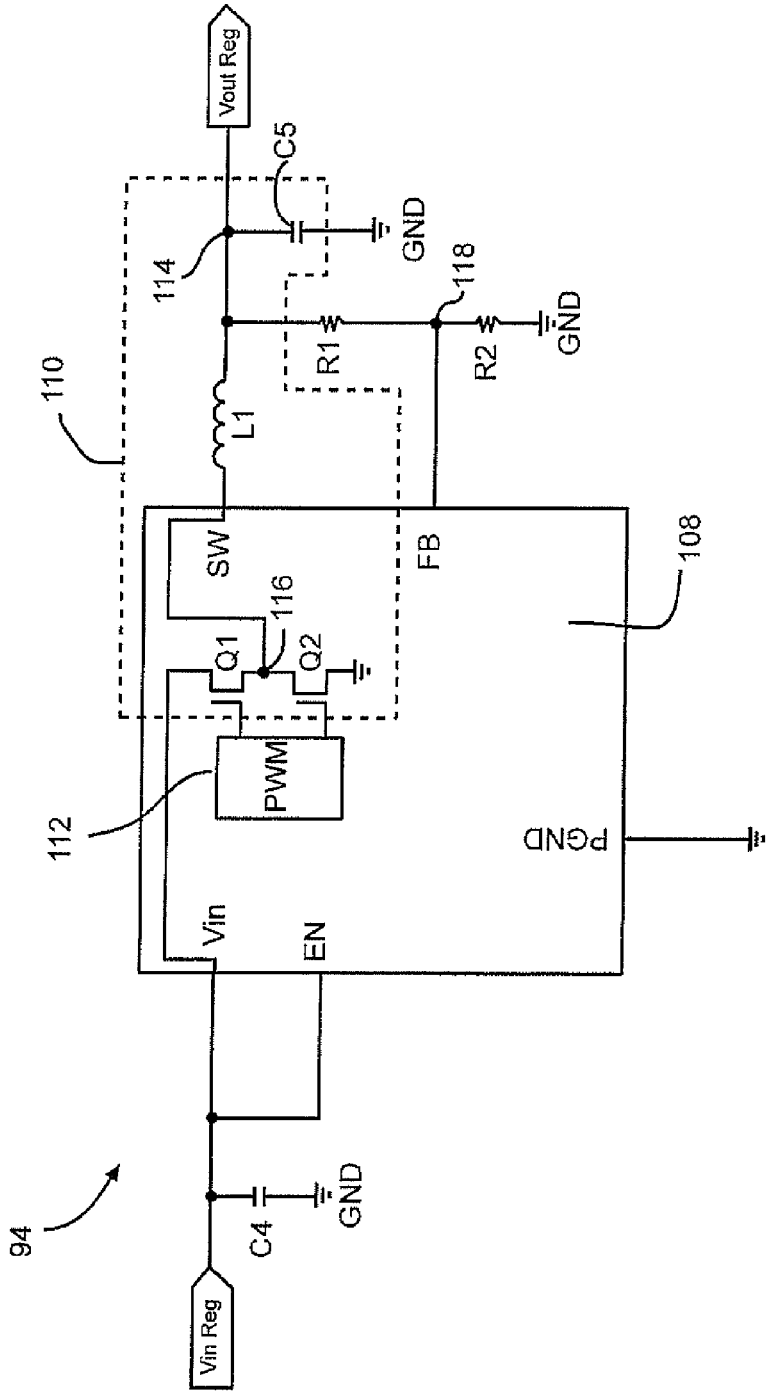
FIG. 7 is an electrical schematic diagram of an embodiment of a voltage regulator sub-circuit that is comprised within the wireless energy capture circuit shown in FIG. 5.

FIG. 7 illustrates an embodiment of the electrical schematic diagram of the voltage regulator circuit 94. As shown, the circuit 94 comprises a first integrated circuit 108 that is capable of modifying the amplitude of the voltage of the incoming electrical power. In a preferred embodiment, the first integrated circuit 108 comprises a synchronous buck voltage converter 110 having a first and second field emission transistors (FET) $Q_1$ and $Q_2$, inductor $L_1$ and capacitor $C_5$. In addition, a first pulse width modulator (PWM) 112 is electrically incorporated within the first integrated circuit 108. The first PWM 112 preferably controls the operation of the buck converter 110 and the resulting amplitude of the voltage of the electrical power that exits the voltage regulator circuit 94 at node 114. The synchronous buck converter 110 is preferred because it is capable of efficiently reducing the amplitude of a voltage without generating a significant amount of heat. Specifically, the regulator sub-circuit 94 of the energy capture circuit 20 of the present invention is capable of reducing the amplitude of the voltage of a received input electrical power from about 10 to 40 volts to about 5V without generating a significant amount of heat. Since the energy storage device 14 is positioned within the tray 58 of the charging base unit 10 to maximize the output of wireless electrical power, use of the buck converter 110 is ideal since the wirelessly configured energy storage devices 14 may receive wireless electrical power having voltages greater than 20V or 30V. Heat generation resulting from reducing the amplitude of the voltage of this magnitude is not desired as such heat could adversely affect an energy storage device 14, particularly secondary lithium electrochemical cell and battery packs. In addition, the regulator sub-circuit 94 comprising the buck converter 110, is designed to accommodate a larger amount of electrical energy on the order of about 50-100 W. Since the magnitude of the received electrical power is a function of the orientation of the energy capture circuit 20 with the transmitting coil 44, the energy capture assembly 12 could receive electrical energies having increased power on the order of 50-100 W, or more. Thus, the regulator sub-circuit 94 having the buck converter 110 allows variation in the magnitude of the received wireless electrical power due to the orientation of the energy capture circuit 20 with respect to the transmitting coil 44.

More specifically, the first PWM 112 works in conjunction with the buck converter 110 to reduce the amplitude of the output voltage of the voltage regulator circuit 94 by comparing the output voltage at node 116 to a reference voltage measured at node 118. The reference voltage is established at node 118 by resistors $R_1$ and $R_2$ that are connected in electrical series. The reference voltage is measured at the voltage feedback pin (FB) by the first PWM 112 which thus controls the operation of the buck regulator 110 to appropriately reduce the amplitude of the voltage output of the electrical power. In addition to the first integrated circuit 108, the voltage regulator sub-circuit 94 also comprises an LC filter which comprises inductor $L_1$ and capacitor $C_5$. Capacitor $C_4$ serves as a filter for the sub-circuit 94. In a preferred embodiment, the first integrated circuit 108 is configured to always be in an enabled or "on" configuration. This allows for the incoming electrical power from node 104 of the conditioning sub-circuit 92 to always be received by the first integrated circuit 108 of the voltage regulator sub-circuit 94.

Figure 8:
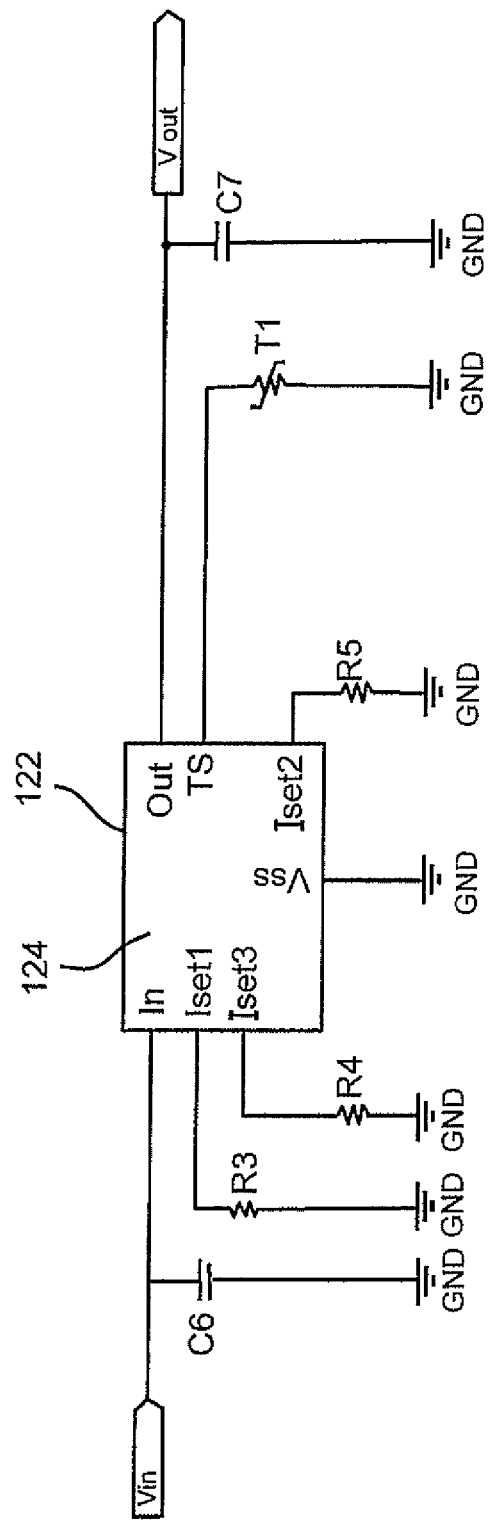
FIG. 8 is an electrical schematic diagram of an embodiment of a charger sub-circuit that is comprised within the wireless energy capture circuit shown in FIG. 5.

FIG. 8 illustrates an embodiment of a charging sub-circuit 96 that is comprised within the energy capture circuit 20 of the wireless charging system of the present invention. As shown, the charging sub-circuit 96 comprises a second integrated circuit 122 that acts as a voltage regulator to further modify the amplitude of the voltage of the incoming electrical power after the voltage of the electrical power is initially reduced by the voltage regulator sub-circuit 94. In a preferred embodiment, the charging sub-circuit 96 fine tunes the amplitude of the voltage within about +/−2 V such that it can be optimally utilized to charge the energy storage device 14. In a preferred embodiment, the second integrated circuit 122 comprises a linear voltage regulator 124 electrically incorporated therewithin. The linear voltage regulator 124 is capable of making fine adjustments to the amplitude of the voltage of the incoming power. Such capability of making relatively small adjustments to the amplitude of the voltage of the charging electrical power is particularly ideal for recharging lithium secondary cells having a relatively small size. The voltage of such secondary cells may vary only by about 2V or less during use thus, it is ideal to use a linear voltage regulator that is capable of making small incremental adjustments to the magnitude of the voltage. However, linear voltage regulators are generally known to generate heat. Heat generated by a linear voltage regulator is generally proportional to the magnitude of the voltage adjustment. Thus, for example, reducing the amplitude of a voltage from about 30 or 40 volts to about 5 volts generates more heat as compared to reducing the amplitude of a voltage from about 10 V to about 5 V. Since electrochemical cells, particularly lithium secondary cells of a relatively small size are generally adversely affected by heat generation, the energy capture circuit 20 preferably comprises a combination of the buck converter 110, incorporated within the voltage regulator sub-circuit 94 and the linear voltage regulator 124, incorporated within the charger sub-circuit 96. Thus, the buck converter 110 acts as a pre-voltage regulator in that it efficiently reduces the voltage of the incoming electrical power such that it can be more easily managed by the linear voltage regulator 124 without generating a significant amount of heat which could adversely affect the energy storage device 14.

In a preferred embodiment, the charging sub-circuit 96 establishes the charge rate of the energy storage device 14. In an embodiment, the charging sub-circuit 96 is capable of a modifying the charge rate based on the state of voltage of the energy storage device 14, the temperature of the energy storage device 14, and combinations thereof. The second integrated circuit 122 is generally capable of modifying the charge rate based on conditions of the voltage state of the cell and cell temperature. In a preferred embodiment, the second integrated circuit 122 comprises voltage sensors $Iset_1$, $Iset_2$, and $Iset_3$ which respectively establish the current charge set point based on the dynamic measurement of the state of voltage of the energy storage device and/or the temperature of the device, measured by thermistor $T_1$. For example, if the energy storage device is determined by the second integrated circuit 122 to be within a certain state of voltage and is operating within normal temperature parameter, i.e., between about 20° C.-35° C., a first current charge rate is utilized. However, if the energy storage device 14 is determined by the integrated circuit to be below a certain state of voltage, i.e., below about 2.8V or is operating at a temperature that is greater than a set temperature, i.e., between about 35° C.-50° C., the current charge rate is modified to stabilize the energy storage device 14. In addition, the charging circuit comprises resistors $R_3$-$R_5$ and capacitors $C_6$ and $C_7$ which are utilized separately, or in combination, as electrical filters to stabilize the output voltage of the linear regulator 124 of the charging sub-circuit 96.

Figure 9:
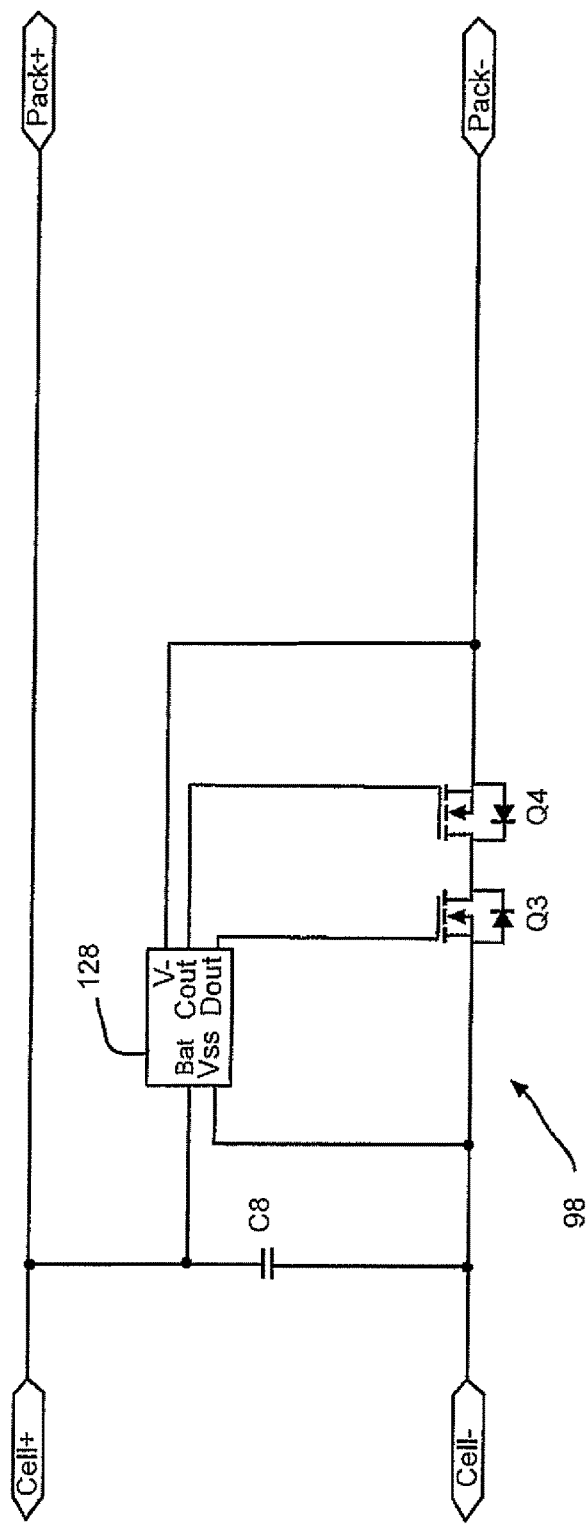
FIG. 9 illustrates an electrical schematic diagram of a protection sub-circuit that is comprised within the wireless energy capture circuit shown in FIG. 5.

FIG. 9 illustrates an embodiment of a protection sub-circuit 98. In an embodiment, the protection sub-circuit 98 acts as a safety measure that protects the energy storage device 14 from potential damage as a result of being over-charged, over-discharged, or exceeding a set temperature during use and/or recharge. In an embodiment, the protection sub-circuit 98 protects the energy storage device 14 from becoming over-charged to a voltage state that is too high. In addition, the protection sub-circuit 98 protects the energy storage device 14 from becoming over-discharged to a voltage state that is too low. Furthermore, the protection sub-circuit 98 protects the energy storage device 14 from exceeding a set temperature during re-charge.

In an embodiment, the protection sub-circuit 98 comprises a third integrated circuit 128, field emission transistors $Q_3$ and $Q_4$, and capacitor $C_8$. In a preferred embodiment, $Q_3$ and $Q_4$ act as a circuit breaker that either connects or disconnects the charging current from the energy capture circuit 20 to or from the energy storage device 14. In a preferred embodiment, integrated circuit control pin $C_{out}$ is used to control the operation of $Q_4$ and integrated circuit control pin $D_{out}$ is used to control the operation of $Q_3$. In addition, the integrated circuit 128 preferably comprises a voltage sensor (BAT) that measures the voltage state of the energy storage device 14. For example, if the energy storage device 14 is at an under or over voltage state, i.e., below about 2.6 V or at an over voltage state, i.e., greater than about 4.2 V, $Q_3$ and $Q_4$ are controlled to disconnect the energy capture circuit 20 and charging current from the energy storage device 14. In an embodiment the $V_{ss}$ pin and $V^-$ pin within the integrated circuit 128 are used to measure the voltage drop between $Q_3$ and $Q_4$, respectively, which is used to determine the amount of electrical current that is flowing into the energy storage device 14 as it exits the protection sub-circuit 98. The protection circuit 98 also comprises capacitor $C_8$ which is utilized as an electrical filter for the sub-circuit 98.

Figure 10:
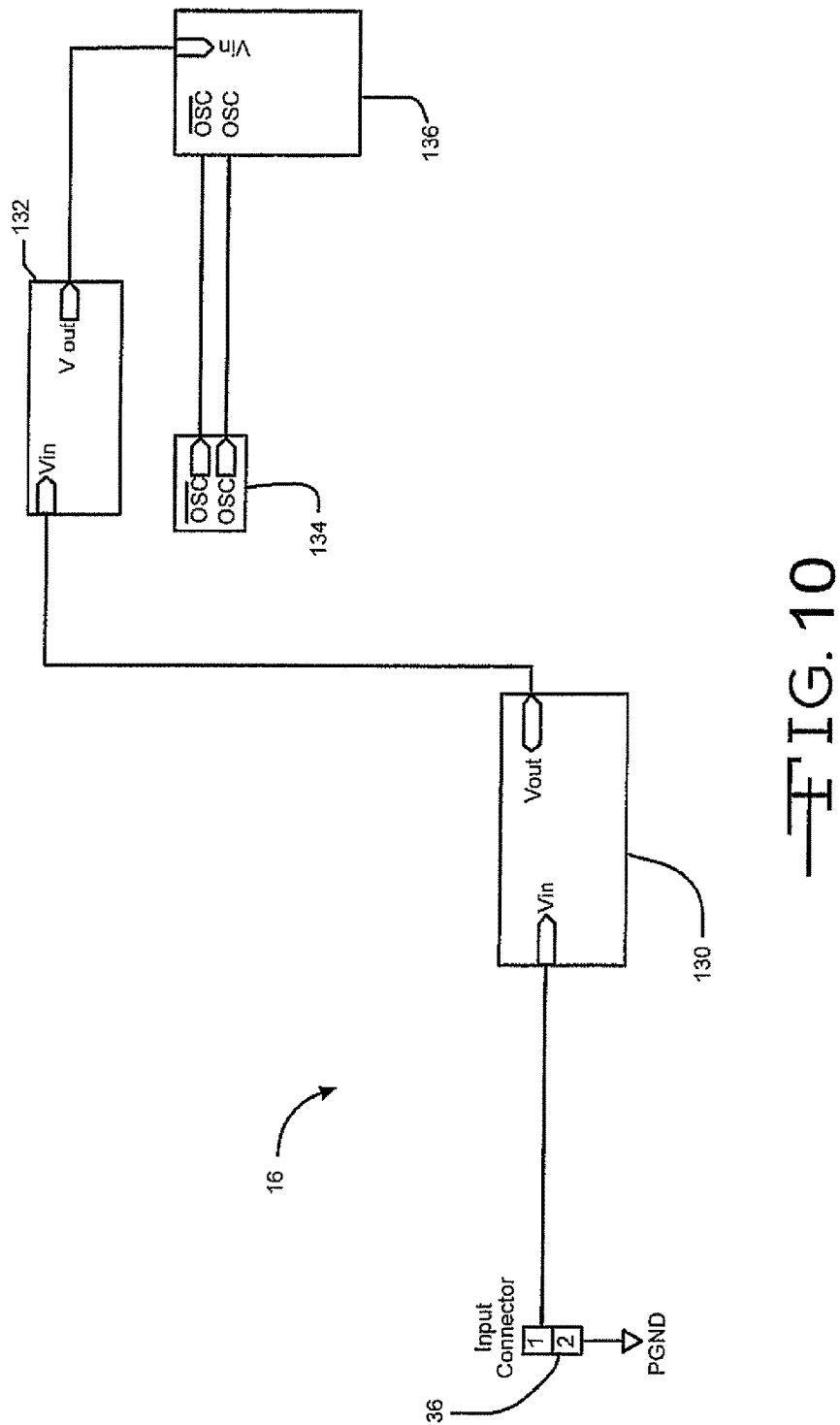
FIG. 10 illustrates an electrical schematic diagram of an embodiment of a wireless energy transmitting circuit that is incorporated within the base unit of the wireless energy transmitting system of the present invention.

FIG. 10 illustrates an embodiment of the energy transmitting circuit 16 that is housed within the base unit 10. The energy transmitting circuit 16 comprises an external power supply connector 36, a power supply sub-circuit 130, a power management sub-circuit 132, a pulse width modulator sub-circuit 134 and an inverter sub-circuit 136. The power supply sub-circuit 130 receives electrical power from an external electrical power supply source via the external power supply connector 36. The power supply sub-circuit 134 utilizes the received electrical power to provide electrical power to the various sub-circuits that comprise the energy transmitting circuit 16 and in addition, modify and condition the received electrical power for wireless transmission.

After the received electrical power exits the power supply sub-circuit 130, the electrical power enters the power management sub-circuit 132 where it is conditioned for wireless transfer. Once the electrical power is properly modified by the power management sub-circuit 132, the power enters the inverter sub-circuit 136 which comprises the transmitting, first coil 44, where the power is wirelessly transmitted. The pulse width modulator sub-circuit 134 works in conjunction with the inverter circuit 136. In a preferred embodiment, the pulse width modulator circuit 134 provides a clock signal which controls the frequency of the transmitted electrical power.

Figure 11:
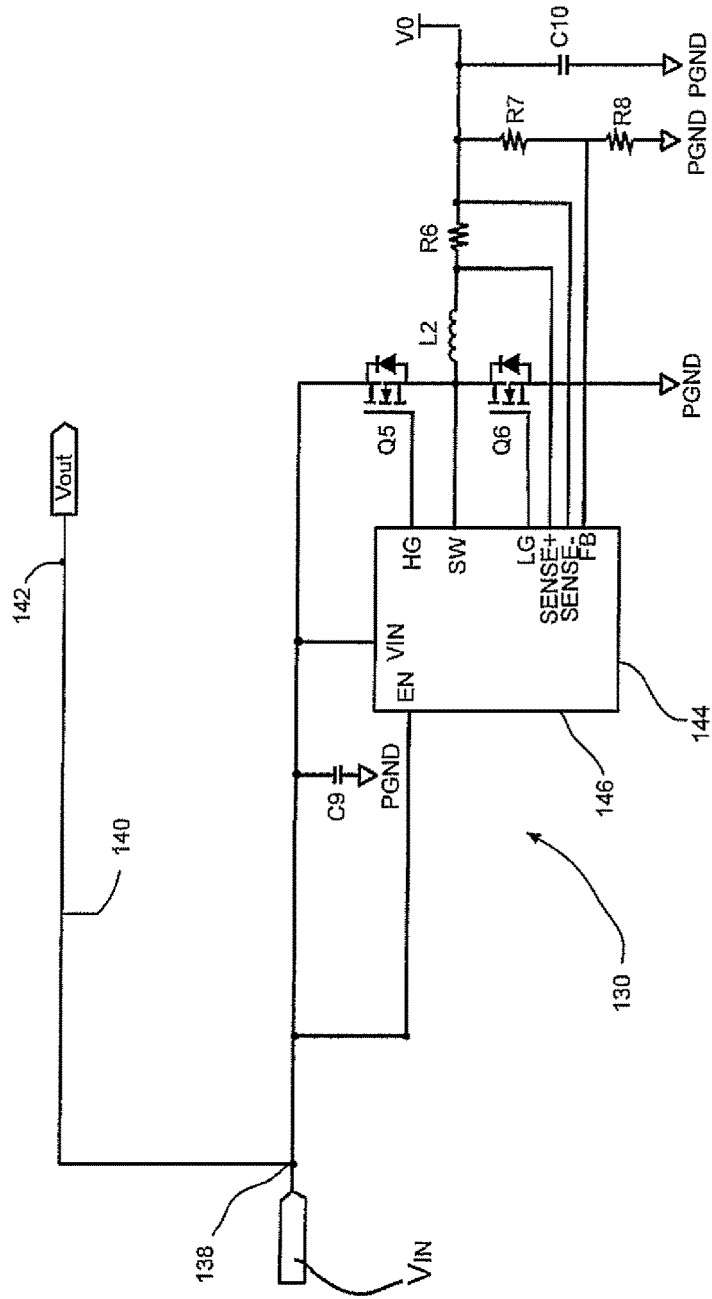
FIG. 11 is an electrical schematic diagram of an embodiment of a power supply sub-circuit that is comprised within the wireless electrical energy transmission circuit shown in FIG. 10.

FIG. 11 illustrates an embodiment of the power supply sub-circuit 130 of the energy transmitting circuit 16 that is housed within the transmitting base unit 10. As its name implies, the power supply sub-circuit 130 provides the electrical power that is used to operate the various sub-circuits that comprise the energy transmitting circuit 16 within the base unit 10. In an embodiment, electrical power from an external power supply, such as an electrical outlet (not shown), is received at node 138 within the power supply sub-circuit 130. Once received at the node, the incoming electrical power is split into first and second electrical power portions. The first portion of the incoming electrical power is transmitted wirelessly through the transmitting second coil 44 while the second portion is utilized to provide electrical power to the various sub-circuits that comprise the transmitting base unit 10. As illustrated in FIG. 11, the first electrical power portion travels through the power supply sub-circuit 130 along power line 140 and exits the power supply sub-circuit 130 at node 142 of Vout. The first portion of electrical power is directed to the power management sub-circuit 132 for wireless transmission. The second portion of the incoming electrical power continues through the power supply sub-circuit 130 where the power is modified to produce an operating electrical power having an operating voltage of $V_o$. In an embodiment, the operating electrical power provides electrical power that operates the various components and sub-circuits that comprise the energy transmitting circuit 16. In a preferred embodiment, operating voltage $V_o$ is dependent on the operating voltage of the circuit 16 where it may range from about 3V to about 8V.

In an embodiment, the power supply sub-circuit 130 comprises a third integrated circuit 144 that comprises a buck voltage converter 146 incorporated therewithin. The buck converter 146 comprises field emission transistors $Q_5$ and $Q_6$, inductor $L_2$ and capacitor $C_{10}$. In a preferred embodiment, the buck converter 146 utilizes the duty cycle of the field emission transistors $Q_5$ and $Q_6$ to reduce the amplitude of the voltage of the incoming electrical power to operating voltage $V_o$, such that it can be used to power the circuitry of the base unit 10. In an embodiment, an operating voltage ($V_o$) of about 5V is desired to provide electrical power that operates the sub-circuits of the energy transmitting circuit 16 within the transmitting base unit 10. In a preferred embodiment, the high gate (HG) of the integrated circuit 144 controls the operation of $Q_5$ and the low gate (LG) of the integrated circuit 144 controls the operation of $Q_6$.

In addition, the power supply sub-circuit 130 comprises resistors $R_7$ and $R_8$ that are electrically connected in series. In a preferred embodiment, the electrical connection of resistors $R_7$ and $R_8$ provide the integrated circuit 144 a feedback voltage that is utilized to dynamically adjust the voltage of the operating electrical power. In addition, Sense$^+$ and Sense$^-$ are pins within the integrated circuit 144 that are each capable of measuring a voltage at the respective pin location. In an embodiment, the integrated circuit 144 is capable of determining the amount of electrical current that is being created by the circuit 130 by measuring a voltage drop across resistor $R_6$ that is electrically connected between the Sense$^+$ and Sense$^-$ pins. Capacitor $C_9$ provides an electrical filter to the circuit 130.

Figure 12:
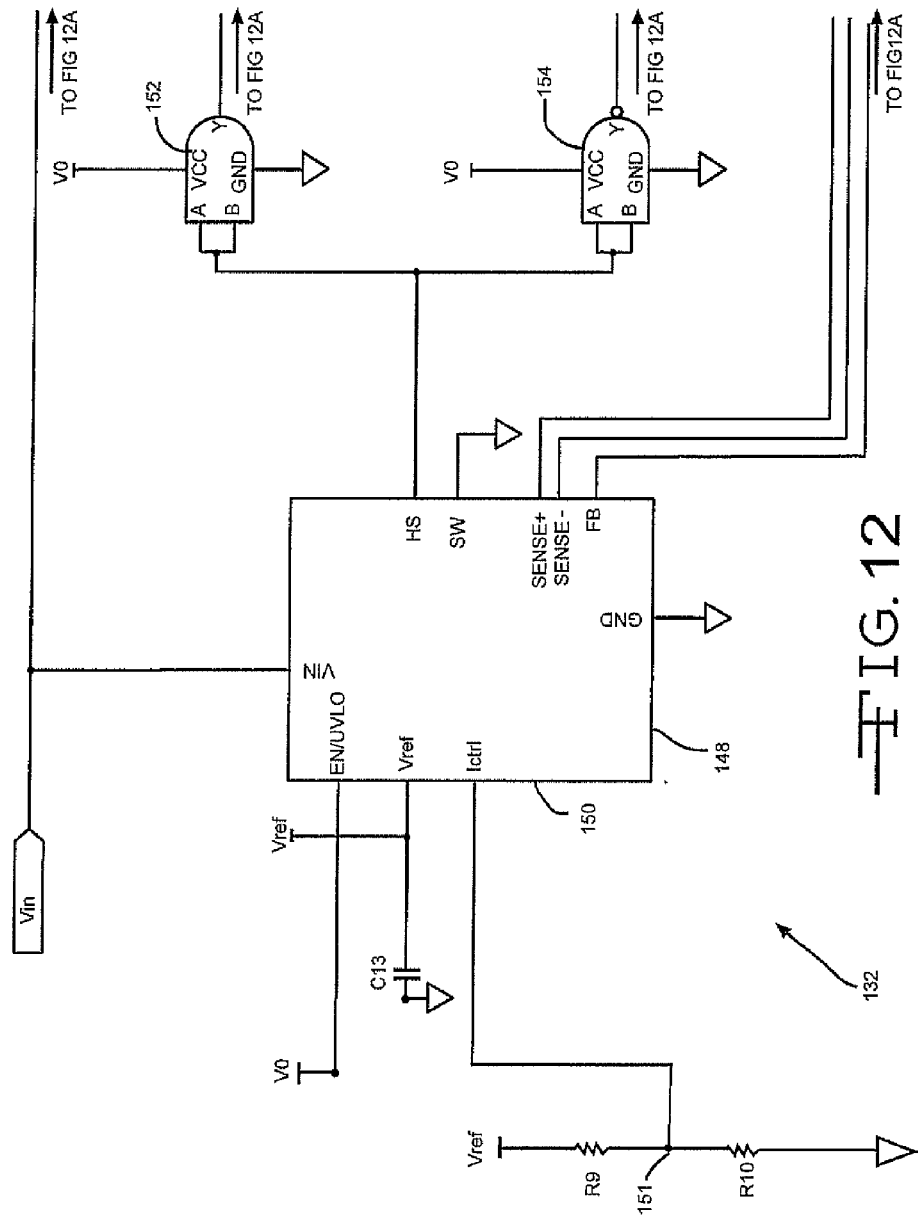
FIGS. 12 and 12A illustrate an electrical schematic diagram of an embodiment of an electrical power management sub-circuit that is comprised within the wireless electrical energy transmission circuit shown in FIG. 10.
Figure 12A:
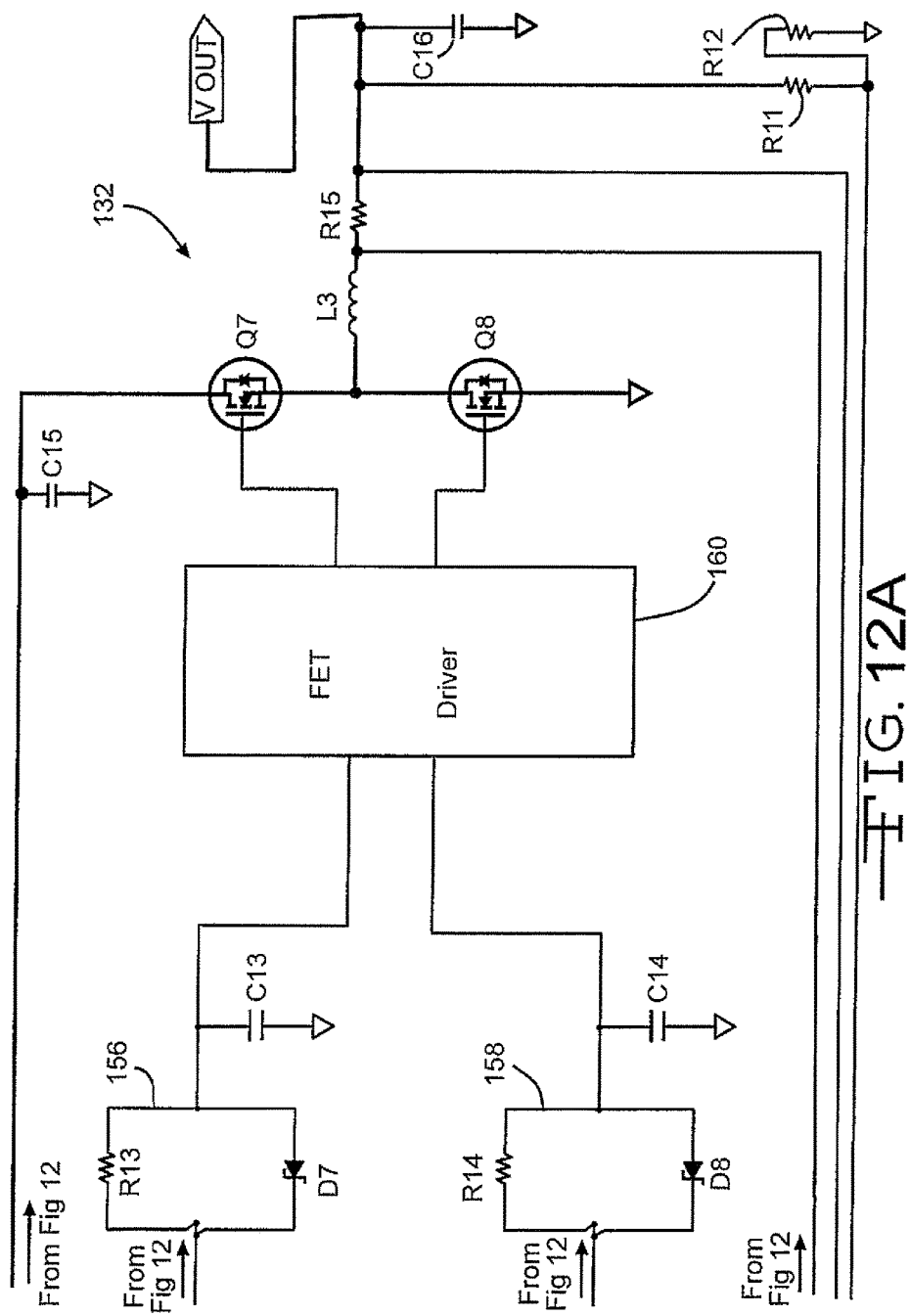

FIGS. 12 and 12A illustrate an embodiment of the power management sub-circuit 132 of the energy transmitting circuit 16 of the present invention. The power management sub-circuit 132 controls the amount of current that flows into the transmitting coil 44, which thus determines the intensity of the magnetic field that is emanated by the second coil 44 within the transmitting base unit 10. In an embodiment, the power management sub-circuit 132 comprises a fourth integrated circuit 148 having a constant current, constant voltage buck converter 150 incorporated therewithin that is electrically connected to the inverter sub-circuit 136. It is noted that the fourth integrated circuit is preferably configured to generate a reference voltage ($V_{ref}$) that may range from about 1V to about 4V. A reference voltage of about 2V is preferred in this circuit. In a preferred embodiment, the buck converter 150 controls the amount of electrical power that is directed into the inverter sub-circuit 136 and transmitted wirelessly therefrom. Thus, the buck converter 150 controls the amount of electrical power that is transmitted by the transmitting first coil 44.

In a preferred embodiment, the magnitude of current that emanates from integrate circuit 148 is determined by measuring a reference voltage at Icontrol pin. The reference voltage is created at node 151 which resides between resistors $R_9$ and $R_{10}$ that are electrically connected in series. In addition, the power management sub-circuit 132 comprises resistors $R_{11}$ and $R_{12}$ that are electrically connected in series. In a preferred embodiment, the electrical connection of resistors $R_{11}$ and $R_{12}$ provide the integrated circuit 148 a feedback voltage that is utilized to dynamically adjust the voltage of the electrical power that exits the sub-circuit 132. In addition, Sense$^+$ and Sense$^-$ are pins within the integrated circuit 148 that are each capable of measuring a voltage at the respective pin location. In an embodiment, the integrated circuit 148 is capable of determining the amount of electrical current that is being created by the circuit 132 by measuring a voltage drop across resistor $R_{15}$ that is electrically connected between the Sense$^+$ and Sense$^-$ pins.

In addition to the integrated circuit 148, the power management sub-circuit 132 further comprises a buck converter that comprises field emission transistors $Q_7$ and $Q_8$, inductor $L_3$ and capacitor $C_{16}$. This buck converter which is operated by integrated circuit 148 dynamically adjusts the voltage of the electrical power that is wirelessly transmitted by the inverter sub-circuit 136.

In a preferred embodiment, FETs $Q_7$ and $Q_8$ are composed of GaN which are capable of high frequency operation on the order of about 13.56 Mhz. However, these preferred FETs have a limited gate source voltage of about 6V which is not sufficient for optimal operation. To compensate for this limitation, the power management sub-circuit 132 further comprises a clock signal circuit that comprises AND gate 152, NAND gate 154, first and second dead time circuits 156, 158, and FET driver 160. The clock signal circuit electrically connects alternating FETS $Q_7$ and $Q_8$ to integrated circuit 148. Thus, the integrated circuit 148 dynamically adjusts the output voltage of the electrical power by controlling the movement of FETS $Q_7$ and $Q_8$ through the clock signal circuit.

Figure 13:
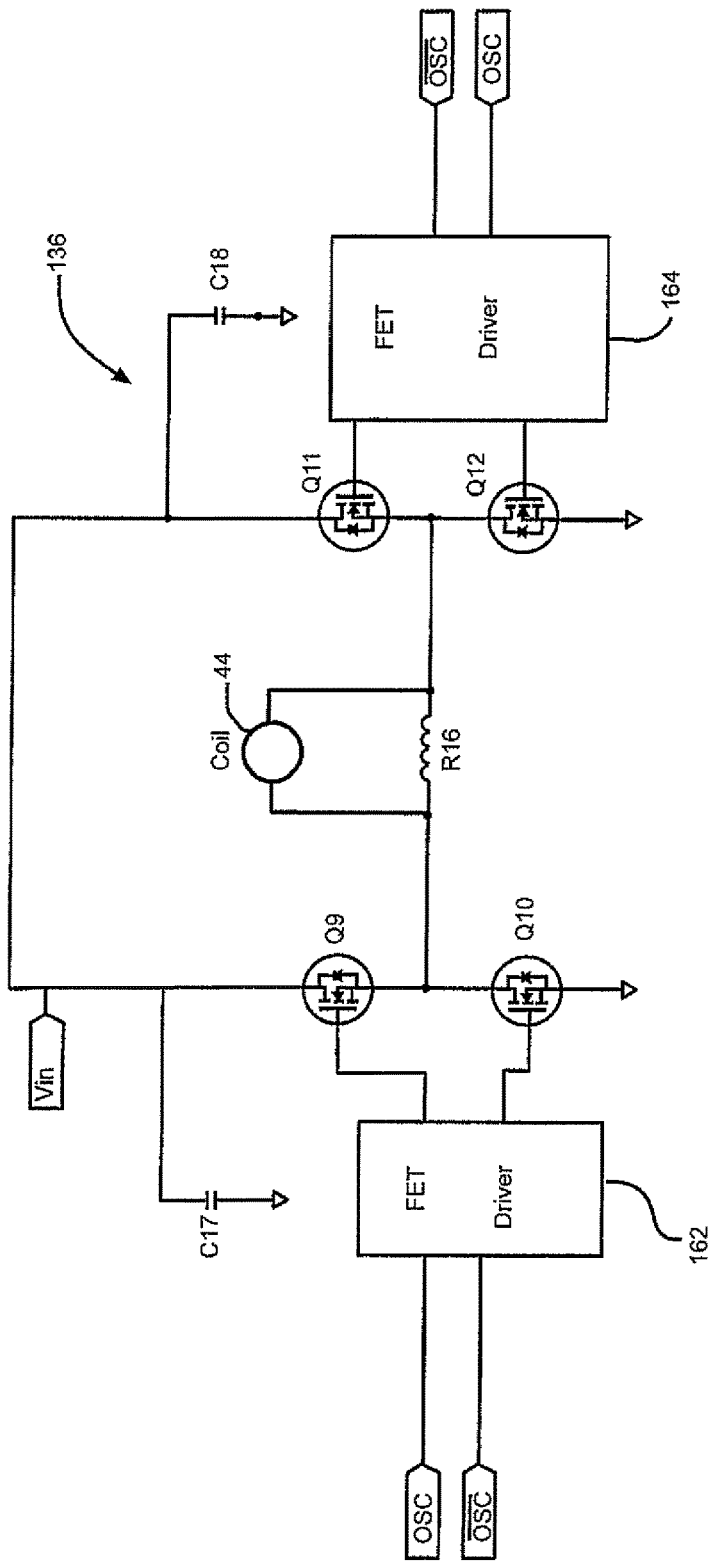
FIG. 13 shows an electrical schematic diagram of an embodiment of an inverter sub-circuit that is comprised within the wireless electrical energy transmission circuit shown in FIG. 10.

FIG. 13 shows an embodiment of the inverter sub-circuit 136 of the energy transmitting circuit 16 of the present invention. In a preferred embodiment, inverter sub-circuit 136 comprises a class "D" amplifier. As shown, the inverter sub-circuit 136 comprises field effect transistors $Q_9$-$Q_{12}$, first and second field effect transistor drivers 162, 164 and transmitting coil 44. In a preferred embodiment, an alternating current is created across transmitting coil 44 by the alternating movement of field emission transistors $Q_9$-$Q_{12}$. Thus, by creating an alternating current electrical power across inductor coil 44 causes the transmitting coil 44 to emanate an alternating magnetic field.

In a preferred embodiment, the alternating current of the electrical power is generated by the coordinated movement of the field emission transistors $Q_9$-$Q_{12}$. In the embodiment shown, field emission transistors $Q_9$ and $Q_{12}$ form a first FET set and field emission transistors $Q_{11}$ and $Q_{10}$ form a second FET set. In a preferred embodiment, movement of the FETs within each first and second set are preferably synchronized together meaning that $Q_9$ and $Q_{12}$ of the first set are simultaneously in an "open" or "closed" position and $Q_{10}$ and $Q_{11}$ of the second set are simultaneously in an "open" or "closed" position. Furthermore, when the field emission transistors of the first set are in an "open" position, the field emission transistors of the second set are in an "closed" position and vice versa. Thus, by alternating the open and closed positions of the FETs within their respective sets, an electrical current alternates back and forth across resistor $R_{16}$, thereby creating an electrical power having and alternating current across coil 44. The movement of the respective field emission transistors is preferably controlled by first and second FET drivers 162 and 164.

In an embodiment, the frequency of this coordinated alternating open and close movement of respective FETs is controlled by the pulse modulator sub-circuit 134. In a preferred embodiment, the frequency of the alternating first and second sets of FETs is determined by the frequency of the resonating clock source created by the pulse width modulator sub-circuit 134. The frequency of the resonant oscillating magnetic field that is emitted by the second transmitting coil 44, is thus controlled by the clock frequency signal created by the pulse width modulator sub-circuit 134.

Figure 14:
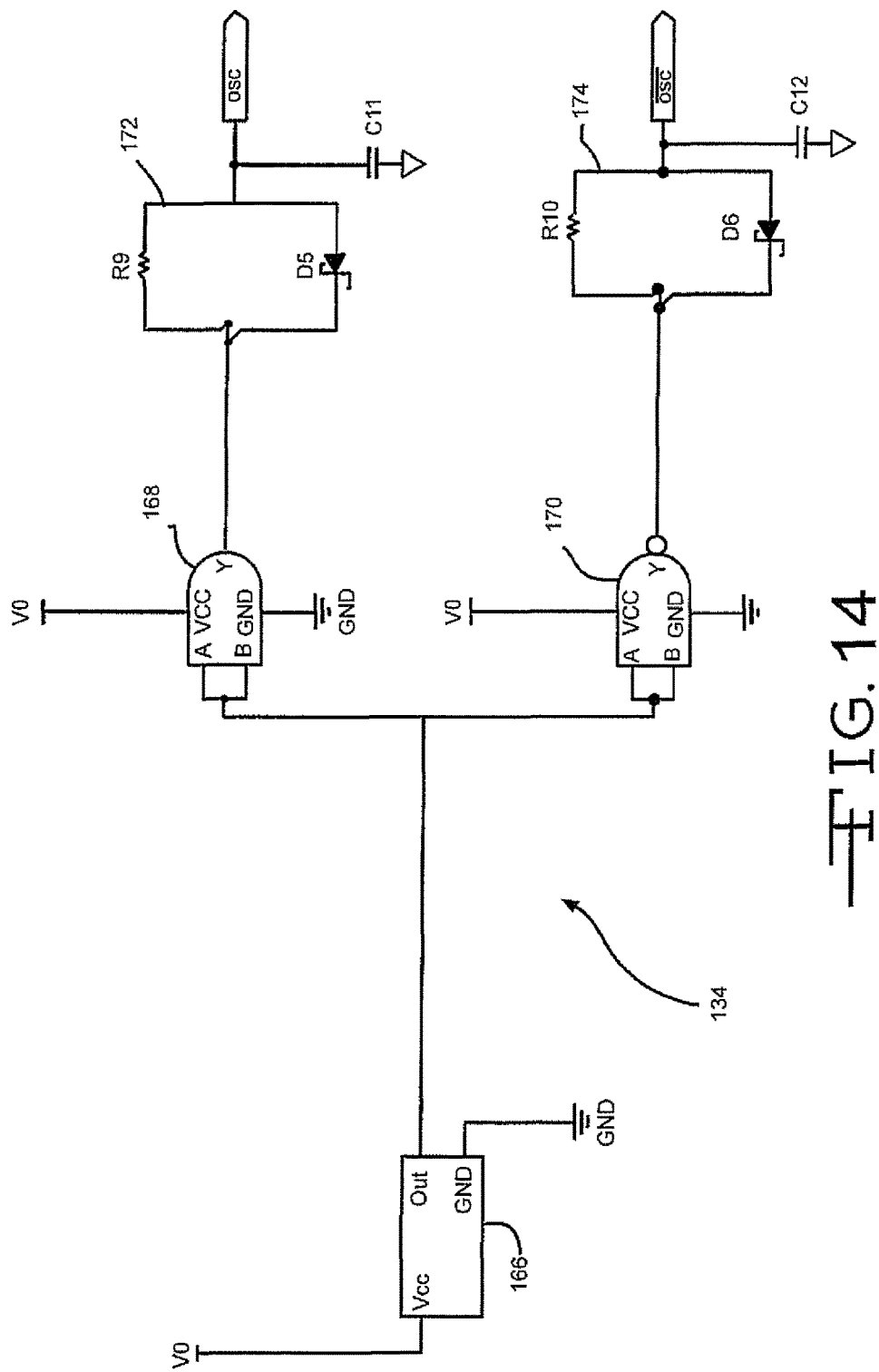
FIG. 14 shows an electrical schematic diagram of an embodiment of a pulse width modulator sub-circuit that is comprised within the wireless electrical energy transmission circuit shown in FIG. 10.

FIG. 14 illustrates an embodiment of the pulse width modulator sub-circuit 134 of the energy transmitting circuit 16. In a preferred embodiment, the pulse width modulator sub-circuit 134 generates a clock signal reference that is utilized by the inverter sub-circuit 136. More specifically, the pulse width modulator sub-circuit 134 establishes the frequency of the oscillation utilized by the inverter circuit 146. As illustrated in FIG. 14, the pulse width modulator sub-circuit 134 comprises a clock resonator source 166, such as an oscillating crystal or ceramic material having a clock frequency output. In addition, the PWM sub-circuit 134 comprises an and-gate 168 and a nand-gate 170 that are electrically connected in parallel with the clock signal reference 166. In addition, each of these logic gates 168, 170 are connected to respective dead-time circuits 172, 174. As illustrated, dead time circuit 172 comprises resistor $R_9$, diode $D_5$ and capacitor $C_{11}$ and dead-time circuit 174 comprises resistor $R_{10}$, diode $D_6$ and capacitor $C_{12}$. Each of these dead-time circuits 172, 174 provides a switching time delay between of the oscillations of the FETS $Q_9$-$Q_{12}$ that comprise the inverter circuit 136. In other words, these dead-time circuits 172, 174 of the respective FETS $Q_9$-$Q_{12}$ that comprise the inverter circuit 136 creates a time delay such that the respective FETS do not electrically short or create shoot through.

It is appreciated that various modifications to the inventive concepts described herein may be apparent to those of ordinary skill in the art without departing from the spirit and scope of the present invention as defined by the appended claims.

What is claimed is:

1. A base unit for wirelessly charging an electrical energy storage device, the base unit comprising:
   a) a housing comprising a housing upper surface and a housing lower surface, wherein a tray portion of the housing is configured to contain at least one electrical energy storage device that is intended to be charged, the tray portion of the housing comprising a tray platform that resides in a first plane and is recessed inwardly from the housing upper surface towards the housing lower surface;
   b) an electrical energy supply unit positioned inside the housing and being electrically connectable to an external electrical power supply;
   c) a main circuit board positioned inside the housing and being electrically powered by the electrical energy supply unit; and
   d) an antenna circuit board positioned inside the housing and being electrically connected to the main circuit board, wherein the antenna circuit board supports a wireless energy transmitting antenna comprising a resonant inductor coil that resides in a second plane spaced from the first plane of the tray platform, the resonant inductor coil being configured to wirelessly transmit electrical energy to charge an electrical energy storage device supported on the tray platform,
   e) wherein the first plane of the tray platform and the second plane of the resonant inductor coil are parallel to and aligned with each other.

2. The base unit of claim 1, wherein the main circuit board supports an electrical energy transmitting circuit, the electrical energy transmitting circuit comprising a power management sub-circuit having a first integrated circuit electrically connected to a clock signal circuit comprising an AND gate, a NAND gate, a first field emission transistor, and a second field emission transistor.

3. The base unit of claim 2, wherein the electrical energy transmitting circuit comprises an inverter sub-circuit that is electrically connected to the antenna circuit board, and wherein the wireless energy transmitting antenna supported on the antenna circuit board and comprising the resonant inductor coil is electrically connected to a first set of field emission transistors ($Q_9$, $Q_{12}$) and a second set of field emission transistors ($Q_{10}$, $Q_{11}$), and wherein alternating open and closed positions of the respective first and second sets of field emission transistors causes an electrical power having an alternating current to flow across the resonant inductor coil.

4. The base unit of claim 3, wherein the electrical energy transmitting circuit comprises a pulse width modulator sub-circuit electrically connected to the inverter sub-circuit, the pulse width modulator sub-circuit comprising a clock resonator source and the AND gate electrically connected in parallel with the NAND gate, and wherein the pulse width modulator sub-circuit is configured to provide a clock reference signal to the inverter sub-circuit.

5. The base unit of claim 1, wherein the tray portion of the housing comprises a tray perimeter sidewall that extends from the housing upper surface to the tray platform.

6. The base unit of claim 1, wherein the tray platform is spaced from the antenna circuit board by a first gap that ranges from about 0.1 mm to about 5 mm.

7. The base unit of claim 1, wherein the housing lower surface comprises a contoured lower surface portion disposed between a first foot that is spaced apart from a second foot.

8. The base unit of claim 7, wherein the antenna circuit board is spaced from the first foot by a second gap that ranges from about 2.5 cm to about 10 cm.

9. The base unit of claim 5, wherein the tray perimeter sidewall extends from the housing upper surface to the tray platform at an angle ranging from about 10° to about 90° with respect to a plane of the housing upper surface.

10. The base unit of claim 5, wherein the tray perimeter sidewall and the tray platform are not provided with a resonant inductor coil.

11. The base unit of claim 1, wherein the tray platform comprises a tray platform perimeter residing along the first plane, and wherein, with respect to an imaginary projection of the tray platform onto the resonant inductor coil, an outer perimeter of the resonant inductor coil extends laterally outwardly beyond the tray platform perimeter.

12. The base unit of claim 11, wherein the resonant inductor coil has a spiral shape residing in the second plane.

13. The base unit of claim 11, wherein the outer perimeter of the resonant inductor coil extends laterally outwardly beyond the tray platform perimeter by a distance that ranges from about 1 mm to about 10 mm.

14. The base unit of claim 1, wherein the tray portion of the housing has a depth measured from the tray upper surface to the tray platform that ranges from about 0.5 cm to about 25 cm.

15. A base unit for wirelessly charging an electrical energy storage device, the base unit comprising:
    a) a housing comprising a housing upper surface and a housing lower surface, wherein a tray portion of the housing is configured to contain at least one electrical energy storage device that is intended to be charged, the tray portion of the housing comprising a tray platform residing in a first plane and being recessed inwardly from the housing upper surface towards the housing lower surface, wherein the tray platform comprises a tray platform perimeter residing in the first plane;
    b) an electrical energy supply unit positioned inside the housing and being electrically connectable to an external electrical power supply;
    c) a main circuit board positioned inside the housing and being electrically powered by the electrical energy supply unit; and
    d) an antenna circuit board positioned inside the housing and being electrically connected to the main circuit board, wherein the antenna circuit board supports a wireless energy transmitting antenna comprising a resonant inductor coil residing in a second plane spaced from the first plane of the tray platform, the resonant inductor coil being configured to wirelessly transmit electrical energy to charge an electrical energy storage device supported on the tray platform,
    e) wherein the first plane of the tray platform and the second plane of the resonant inductor coil are parallel to and aligned with each other, and wherein, with respect to an imaginary projection of the tray platform onto the resonant inductor coil, an outer perimeter of the resonant inductor coil extends laterally outwardly beyond the tray platform perimeter by a distance that ranges from about 1 mm to about 10 mm.

16. The base unit of claim 15, wherein the resonant inductor coil has a spiral shape residing in the second plane.

17. The base unit of claim 15, wherein the tray perimeter sidewall and the tray platform are not provided with a resonant inductor coil.

18. The base unit of claim 15, wherein the tray portion of the housing has a depth measured from the tray upper surface to the tray platform that ranges from about 0.5 cm to about 25 cm.

19. A base unit for wirelessly charging an electrical energy storage device, the base unit comprising:
    a) a housing comprising a housing upper surface and a housing lower surface, wherein a tray portion of the housing is configured to contain at least one electrical energy storage device that is intended to be charged, the tray portion of the housing comprising a tray platform residing in a first plane and being recessed inwardly from the housing upper surface towards the housing lower surface, wherein the tray platform comprises a tray platform perimeter residing in the first plane;
    b) an electrical energy supply unit positioned inside the housing and being electrically connectable to an external electrical power supply;
    c) a main circuit board positioned inside the housing and being electrically powered by the electrical energy supply unit; and
    d) an antenna circuit board positioned inside the housing spaced from the tray platform and being electrically connected to the main circuit board, wherein the antenna circuit board supports a wireless energy transmitting antenna comprising a resonant inductor coil having a spiral shape residing in a second plane, the resonant inductor coil being configured to wirelessly transmit electrical energy to charge an electrical energy storage device supported on the tray platform,
    e) wherein the first plane of the tray platform and the second plane of the resonant inductor coil are parallel to and aligned with each other, and
    f) wherein, with respect to an imaginary projection of the tray platform onto the resonant inductor coil, an outer perimeter of the resonant inductor coil extends laterally outwardly beyond the tray platform perimeter.

20. The base unit of claim 19, wherein the outer perimeter of the resonant inductor coil extends laterally outwardly beyond the tray platform perimeter by a distance that ranges from about 1 mm to about 10 mm.

21. The base unit of claim 19, wherein the tray perimeter sidewall and the tray platform are not provided with a resonant inductor coil.

* * * * *